(12) United States Patent
Khoury

(10) Patent No.: US 9,898,759 B2
(45) Date of Patent: Feb. 20, 2018

(54) METHODS AND SYSTEMS FOR COLLECTING DRIVING INFORMATION AND CLASSIFYING DRIVERS AND SELF-DRIVING SYSTEMS

(71) Applicant: Joseph Khoury, Miami Beach, FL (US)

(72) Inventor: Joseph Khoury, Miami Beach, FL (US)

( * ) Notice: Subject to any disclaimer, the term of this patent is extended or adjusted under 35 U.S.C. 154(b) by 0 days.

(21) Appl. No.: 15/593,785

(22) Filed: May 12, 2017

(65) Prior Publication Data

US 2017/0255966 A1 Sep. 7, 2017

Related U.S. Application Data

(60) Continuation-in-part of application No. 15/366,179, filed on Dec. 1, 2016, which is a division of
(Continued)

(51) Int. Cl.
*G06Q 30/00* (2012.01)
*G06Q 30/02* (2012.01)
(Continued)

(52) U.S. Cl.
CPC ..... *G06Q 30/0266* (2013.01); *G01C 21/3617* (2013.01); *G01C 21/3697* (2013.01);
(Continued)

(58) Field of Classification Search
CPC ........... G06Q 30/0266; G06Q 30/0205; G06Q 40/08; G01C 21/3617; G01C 21/3697;
(Continued)

(56) References Cited

U.S. PATENT DOCUMENTS

2001/0011228 A1* 8/2001 Shenkman ......... G06Q 30/0204
705/14.53
2001/0021915 A1 9/2001 Cohen et al.
(Continued)

OTHER PUBLICATIONS

Non-Final Office Action for U.S. Appl. No. 14/229,821, dated Nov. 23, 2015.

*Primary Examiner* — Bennett M Sigmond
*Assistant Examiner* — Scott C Anderson
(74) *Attorney, Agent, or Firm* — Hamilton, Brook, Smith & Reynolds, P.C.

(57) ABSTRACT

Systems and methods for efficiently addressing technical and privacy/authorization obstacles associated with tracking of individuals in a vehicle, and enabling route-based analysis to determine driving behavior, socio-demographics, future profitability, and interests of individuals or self-driving systems. Driving information is collected using a device associated with a driver and a vehicle or using data collected by systems of self-driving vehicles. The frequency and methods used for the collection of driving information can be modified based on location and movement of the device and based on previous classification of the driver or self-driving system, thereby enabling efficient use of bandwidth and battery and increasing accuracy of the classification. The driving information is encoded and transmitted to a server, where future typical route segments that the driver is likely to travel are predicted, and the driver, or the self-driving system, is classified into one or more groups based on the encoded driving information.

17 Claims, 12 Drawing Sheets

Related U.S. Application Data application No. 14/229,821, filed on Mar. 28, 2014, now abandoned.

(51) Int. Cl.

| | |
|---|---|
| *H04L 29/08* | (2006.01) |
| *G01C 21/36* | (2006.01) |
| *G08G 1/01* | (2006.01) |
| *G07C 5/00* | (2006.01) |
| *G07C 5/08* | (2006.01) |
| *G06Q 40/08* | (2012.01) |
| *G05D 1/00* | (2006.01) |

(52) U.S. Cl.
CPC ....... *G05D 1/0088* (2013.01); *G06Q 30/0205* (2013.01); *G06Q 40/08* (2013.01); *G07C 5/008* (2013.01); *G07C 5/085* (2013.01); *G08G 1/0112* (2013.01); *H04L 67/12* (2013.01); *H04L 67/22* (2013.01); *H04L 67/306* (2013.01); *H04L 67/02* (2013.01)

(58) Field of Classification Search
CPC ...... G05D 1/0088; G07C 5/008; G07C 5/085; G08G 1/0112; H04L 67/12; H04L 67/22; H04L 67/306; H04L 67/02
See application file for complete search history.

(56) References Cited

U.S. PATENT DOCUMENTS

| | | | |
|---|---|---|---|
| 2002/0026334 A1 | 2/2002 | Igoe | |
| 2002/0111172 A1* | 8/2002 | DeWolf | G06Q 30/02 455/456.3 |
| 2005/0097028 A1 | 5/2005 | Watanabe et al. | |
| 2011/0082740 A1 | 4/2011 | Colwell et al. | |
| 2011/0178702 A1* | 7/2011 | Lassesson | G01C 21/34 701/408 |
| 2013/0198031 A1* | 8/2013 | Mitchell | G01C 21/3476 705/26.8 |
| 2014/0180730 A1* | 6/2014 | Cordova | G07C 5/085 705/4 |
| 2015/0278855 A1 | 10/2015 | Khoury | |

* cited by examiner

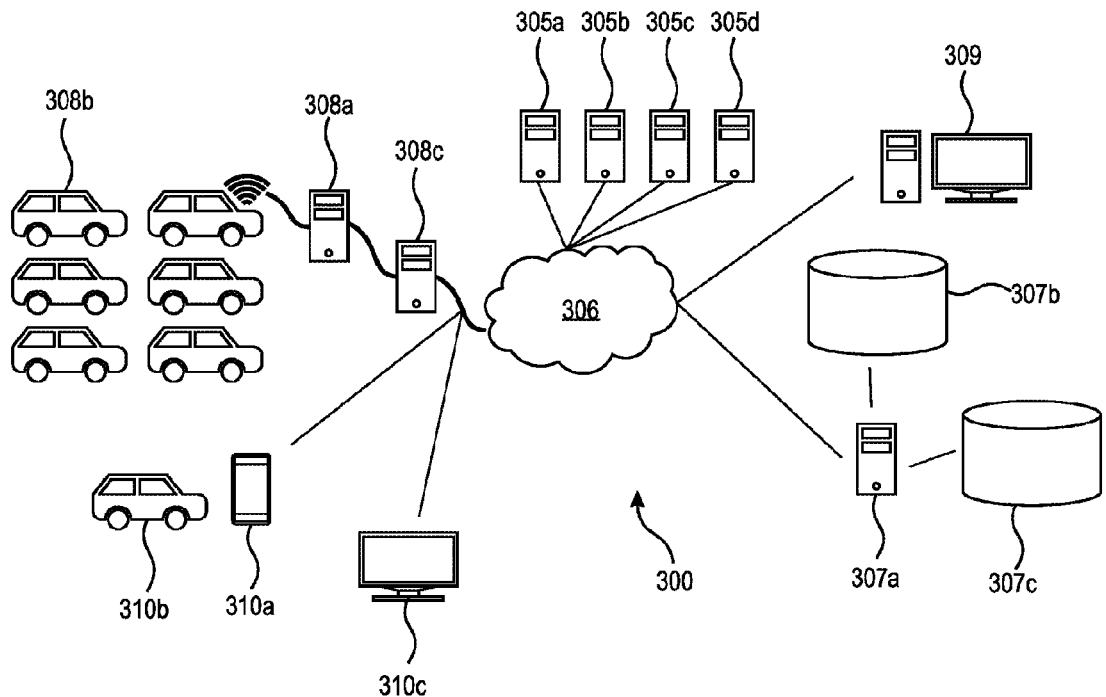

| 300 | SYSTEM |
|---|---|
| 306 | Internet connectivity |
| 310a | individual user mobile phone |
| 310b | Vehicle associated to 110a phone |
| 310c | Computing device associated with 110a phone |
| 308a | Fleet of vehicles using same self-driving technology |
| 308b | Central server associated with 108a technology provider |
| 308c | Self-driven fleets clearing house server |
| 305a | Map and speed limit data provider |
| 305b | Road Accident data provider |
| 305c | Ad network provider |
| 305d | Product service provider interface server and database to provide actual data that relates to profitability of driver or fleets |
| 307a | Main server |
| 307b | Main database - Route database |
| 307c | Database of interest profiles and profit potential |
| 309 | Computing device of merchant advertising |

Fig. 3

METHODS AND SYSTEMS FOR COLLECTING DRIVING INFORMATION AND CLASSIFYING DRIVERS AND SELF-DRIVING SYSTEMS

RELATED APPLICATIONS

This application is a continuation-in-part of U.S. application Ser. No. 15/366,179, filed Dec. 1, 2016, which is a divisional U.S. application Ser. No. 14/229,821, filed Mar. 28, 2014. The entire teachings of the above applications are incorporated herein by reference.

BACKGROUND

A huge ecosystem has been developed around the use of cookies on the Internet to track where people go online and the web sites visited by individuals, but a similar system to track the places visited by people in the physical world and the routes they travel to reach their destinations has yet to be developed. Online, the use of cookies has been widely recognized as critical to allow content providers to monetize more efficiently their web sites by delivering content, promotional offers, and advertising tailored to the demographics, potential profitability, and general profile of an individual as determined by the history of all web pages visited and clicked on, search history, and a large set of data derived from online behavior. Online, it is now very easy to know which sites have been visited and the browsing patterns and behavior and interest profile of most people. In the physical world, however, this capability is not as developed, and an implicit and indirect consumer benefit of using something like physical world tracking cookies has not been introduced. Location based technologies (e.g., GPS or network based location technologies derived from satellite, cellular, or Wi-Fi beacons) have allowed the delivery of content based on approximate (e.g., state/zip code) or precise location (e.g., GPS within 10-50 meters). Although location technologies provide much information for the delivery of various services, as well as content and advertising, real-time punctual location information still lacks additional data elements that could unlock rich new analytical capabilities that determine behavioral patterns and demographics. In the physical world (as in the online world) it is not enough to know where someone is, but one needs to know where that person has been before and where he or she is heading, the time of day, the frequency of routes travelled, and other factors such as correlation with demographics/profiles obtained online. Similarly, the ability to predict the profitability of those individuals for several products and services is dependent on knowing key components of their routes driven and their driving patterns in the physical world, such as, for example, speed, distance travelled, accumulated time and mileage driving, and neighborhood and malls visited. One possible solution could be to constantly track everyone (e.g., through their mobile devices), however the current state of the art has significant limitation as continuous tracking creates both technical obstacles (e.g., amount of data collected, wireless bandwidth utilization, and battery life) and privacy/authorization issues.

SUMMARY OF THE INVENTION

The present disclosure describes systems and methods to efficiently address obstacles such as technical and privacy/authorization issues, and release the rich potential of route-based analysis to determine behavior, demographics, interests, and predicting profit potential for certain products and services. The profit predictive capability can be applied to several industries, and in one embodiment, a clearinghouse exchange system can classify drivers into profitability classes and can interface various service providers with a feedback loop that provides actual profitability for products and services over time of the drivers in order to adjust the predictive algorithms of the clearinghouse exchange system through a self-learning system.

There is significant benefit provided by the methods and systems that provide a profit potential classification of a driver or a fleet of self-driving vehicles based on the routes driven or based on a prediction of the routes driven. For purposes of illustration and without limitation, wireless carriers can make outsized profits from people who do not drive much, and people who pay a monthly fee for data packages they do not use because they are mostly homebound and mostly use Wi-Fi hotspots at home for their data intensive applications. Today, state of the art methods and systems used to understand the amount of driving done by individuals is rudimentary and there are no centralized clearinghouse exchanges to provide information to that effect to providers of products and services.

There is significant benefit provided by methods and systems that provide an interest profile classification of a driver or a fleet of self-driving vehicles based on the routes driven or based on a prediction of the routes driven. For purposes of illustration and without limitation, content, advertisers, and ad networks would benefit from having the capability to target drivers that often go to medical centers and malls on afternoons during weekdays as this may, for example, indicate an older retired target segment. Furthermore, there is significant benefit provided by methods and systems that can reliably deliver promotional offers along certain routes while those promotional offers are still actionable. For purposes of illustration and without limitation, a merchant would have the ability deliver a promotional offer to a driver knowing that the particular driver travels regularly along a route that can be slightly modified with minimal additional drive time to bring the driver to the merchant's establishment, and the delivery of such an offer can be timed in such a way that it occurs prior to the driver passing a specific exit or junction point.

There is significant benefit provided by methods and systems that provide a convenience or a benefit or reward to individuals to allow them to be tracked when in a vehicle and doing so at minimal cost in terms of cost to the individuals and in terms of additional bandwidth/data and battery utilization. For purposes of illustration and without limitation, by leveraging specific methods and systems to automate the start and end time of the tracking so that it coincides with the time a user of a mobile device is in a moving vehicle, significant bandwidth and battery savings can be achieved. Similarly, limited tracking is required in some cases between two road intersections as the vehicle is assumed to follow a known path that has already been geocoded by map providers. Furthermore, the disclosed methods and systems can minimize the amount of data transmitted to the strict minimum required to, for example, reconstruct routes driven, mileage, speed, and driving behavior.

One example embodiment is a method of collecting driving information and classifying drivers, including human drivers or self-driving systems. The method includes collecting driving information using a device associated with a driver and a vehicle, where the driving information can include routes driven in the vehicle, geocoded locations, mileage, times of day, and speeds. The collection of the driving information is enabled and disabled based on location and movement of the device. The method further includes (i) encoding the driving information and transmitting the encoded driving information to a server, (ii) storing, in a database associated with the server, an identifier associated with the driver and the encoded driving information, and (iii) determining, and storing in the database, predicted future typical route segments that the driver is likely to travel over a certain period of time and associated times of day based on the encoded driving information, and (iv) classifying the driver into one or more groups based on the encoded driving information.

Another example embodiment is a system for collecting driving information and classifying drivers. The system includes a device, database, and processor. The device is associated with a driver and a vehicle and (i) collects driving information, where the driving information can include routes driven by the driver in the vehicle, geocoded locations, mileage, times of day, and speeds, (ii) enables and disables the collection of driving information based on location and movement of the device, (iii) encodes the driving information, and (iv) transmits the encoded driving information to a server. The database is associated with the server and is in communication with the device. The database stores an identifier associated with the driver, the encoded driving information, and predicted future typical route segments that the driver is likely to travel over a certain period of time and associated times of day based on the encoded driving information. The processor is associated with the server and is in communication with the database and the device. The processor determines the predicted future typical route segments and classifies the driver into one or more groups based on the encoded driving information.

Bandwidth used by the device for collecting the driving information or the frequency of collection may be adjusted based on the classification of the driver. In some embodiments, an advertisement or promotional content may be associated with at least one of the typical route segments driven by the driver in the vehicle. A point along the associated route segment may be determined at which the advertisement or promotional content is to be presented to the driver, the point along the associated route segment providing a sufficient amount of time for the driver to take an action associated with the advertisement or promotional content. The advertisement or promotional content is then presented to the driver via the device when the driver drives along the associated route segment in the vehicle and reaches the point along the associated route segment at which the advertisement or promotional content is to be presented. The point along the route segment may be, for example, a certain distance before an exit or turn leading to an establishment associated with the advertisement or promotional content, where the certain distance is determined based on vehicle speed and location of vehicle along the route segment. In such embodiments, representations of typical route segments driven by specific target groups of drivers can be provided to an advertisement provider, and an advertisement request may be received from the advertisement provider with a selection of at least one of the route segments driven by the specific target groups of drivers to be associated with an advertisement or promotional content. When an advertisement or promotional content is presented to a driver in some embodiments, the driver may be able to respond to the advertisement or promotional content, and the driver can then be provided a share of advertising revenue for responding to the advertisement or promotional content. In some embodiments, the driver can be presented with an incentive to visit an establishment associated with at least one of the typical route segments if the driver repeatedly travels along the route segment. In such an embodiment, the presence of the driver can be detected around the location of the establishment for a sufficient amount of time to determine whether a visit to the establishment occurred to determine whether to allow a redemption of any promotional incentive provided by the establishment, and an account of the driver can be credited with the incentive if the driver visits the establishment and fulfills any requirements of the incentive.

The device may be a mobile computing device, in which case a profile of the driver can be created based on the driver's use of the mobile device and the encoded driving information. Socio-demographic or potential interests for products and services can be associated with the profile of the driver based on the driving information, and, based on the socio-demographics and interests, the driver can be associated with corresponding advertising categories used by online advertiser networks and exchanges. The driver's activity on the mobile device and the routes driven by the driver and locations visited can be synchronized with the driver's virtual activity on internet browsers to represent, in the profile of the driver, web sites visited using the browser and physical establishments visited or driven by that are associated with the typical route segments to categorize the driver in an advertising category to be used by advertisement providers.

In some embodiments, classifying the driver into one or more groups can include classifying a group of drivers or a fleet of self-driven or partially self-driven vehicles that use materially similar underlying self-driving technology component software, hardware, or sensor configuration. In such embodiments, collecting driving information includes collecting driving information using a device associated with each driver and associated vehicle or using connectivity to processors and systems associated with a self-driven or partially self-driven vehicle, where the driving information can include mileage, routes driven by the vehicle, time of day, and speed. In such embodiments, classifying the driver into one or more groups based on the encoded driving information includes determining an insurance risk (or loss ratio from general expected liability or property claims) for each driver or, in a case of a fleet of self-driven or partially self-driven vehicles, determining an insurance risk by aggregating the encoded driving information of all vehicles of the fleet that uses similar underlying self-driving technology components. In such a case, the insurance risk determination can include applying (i) a plurality of features of the routes driven including, for example, mileage (cumulative or per time period), speed (as compared to speed limit for each road segment), types of roads driven (e.g., highway versus city), types of areas driven through (high risk areas with high historical claims), or zip codes, and (ii) a plurality of features of the driver including, for example, historical routes driven, driving behavior, times of day, age, gender, zip code, credit score, type of car driven, and historical infractions or, in a case of a fleet of self-driven or partially self-driven vehicles, the underlying driving technology including sensors sensitivity, historical cumulative mileage, areas the fleet is being driven, speed at which the fleet is being driven, and percentage of time the vehicles are being self-driven and associated claims across the fleet, to assigned weights for scaling the risk. The driver or underlying driving technology insurance risk classification may be presented to a plurality of entities, requests may be received from at least one of the entities to send promotional messages to drivers within a specific risk classification or provide insurance for or offer services to the driver or fleet of self-driven vehicles using the underlying driving technology, and at least one of the entities may be selected to provide insurance for or offer services to the driver or fleet of self-driven vehicles using the underlying driving technology. Determining an insurance risk for a plurality of self-driven vehicles can include determining an insurance risk based on a combined mileage for the plurality of self-driven vehicles and a combination of routes driven by the plurality of self-driven vehicles. Further, weights affecting the plurality of factors used to determine the classification of insurance risks may be modified in response to actual loss and claims data being provided to cause the determined insurance risk, when applied retroactively to historical route and driver data, to correspond more closely to an actual insurance risk as calculated from actual loss and claims data provided over time.

In some embodiments, the driving information can be matched with route segments known to be associated with self-driving vehicles. The device and driver identifier can be associated with a self-driving capable vehicle status, and time periods, mileage, and route segments during which the vehicle is driven in self-driven mode or driven manually by the driver may be identified. The driving information can be allocated according to the identified time periods, mileage, and route segments to affect the classification of the driver or self-driving system.

In some embodiments, classifying the driver into one or more groups can include classifying the driver according to a predicted profitability potential for certain products or services or according to interests, preferences, behavior profile, and socio-demographics of the driver based on the encoded driving information.

In some embodiments, classifying the driver into one or more groups can include classifying a group of drivers using partially self-driven vehicles for the purpose of predicting an insurance risk according to information not made available to third parties by the providers of self-driven systems and self-driven vehicles such as, for example, (i) who the driver is, (ii) when the vehicle is not driven in self-driven mode (manually driven), (iii) the percentage of time the vehicle is in self-driving mode, (iv) the type of route segments being driven while in self-driving mode, (v) the speed and mileage driven while in self-driving mode, and (vi) the density or percentage of surrounding vehicles on the routes driven that are in a self-driving mode. In such embodiments, the classification can be achieved by matching a specific driver to a self-driven vehicle by matching the path of the driver's mobile device to the path of the self-driven vehicle as determined by the providers of the self-driven systems and self-driven vehicles. The determination of when and where the vehicle is in self-driving mode can further be achieved by matching the typical driving pattern or "signature" of such self-driven vehicle with the encoded driving information. The matching process can include comparing the encoded driving information captured from the device of the driver with (i) typical speed of self-driven vehicles over specific route segments and (ii) typical acceleration and deceleration patterns of self-driven vehicles in the context of traffic lights or changing lanes. Once the driving pattern matching is completed, the extent to which the vehicle is being self-driven can be determined and the corresponding encoded driving information can be associated to the underlying driving technology, and the extent to which the vehicle is driven manually can be determined and the corresponding encoded driving information is associated to the proper driver identifier.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a schematic diagram illustrating a system for collecting driving information and classifying drivers, according to an example embodiment of the invention.

DETAILED DESCRIPTION OF THE INVENTION

Figure 1:
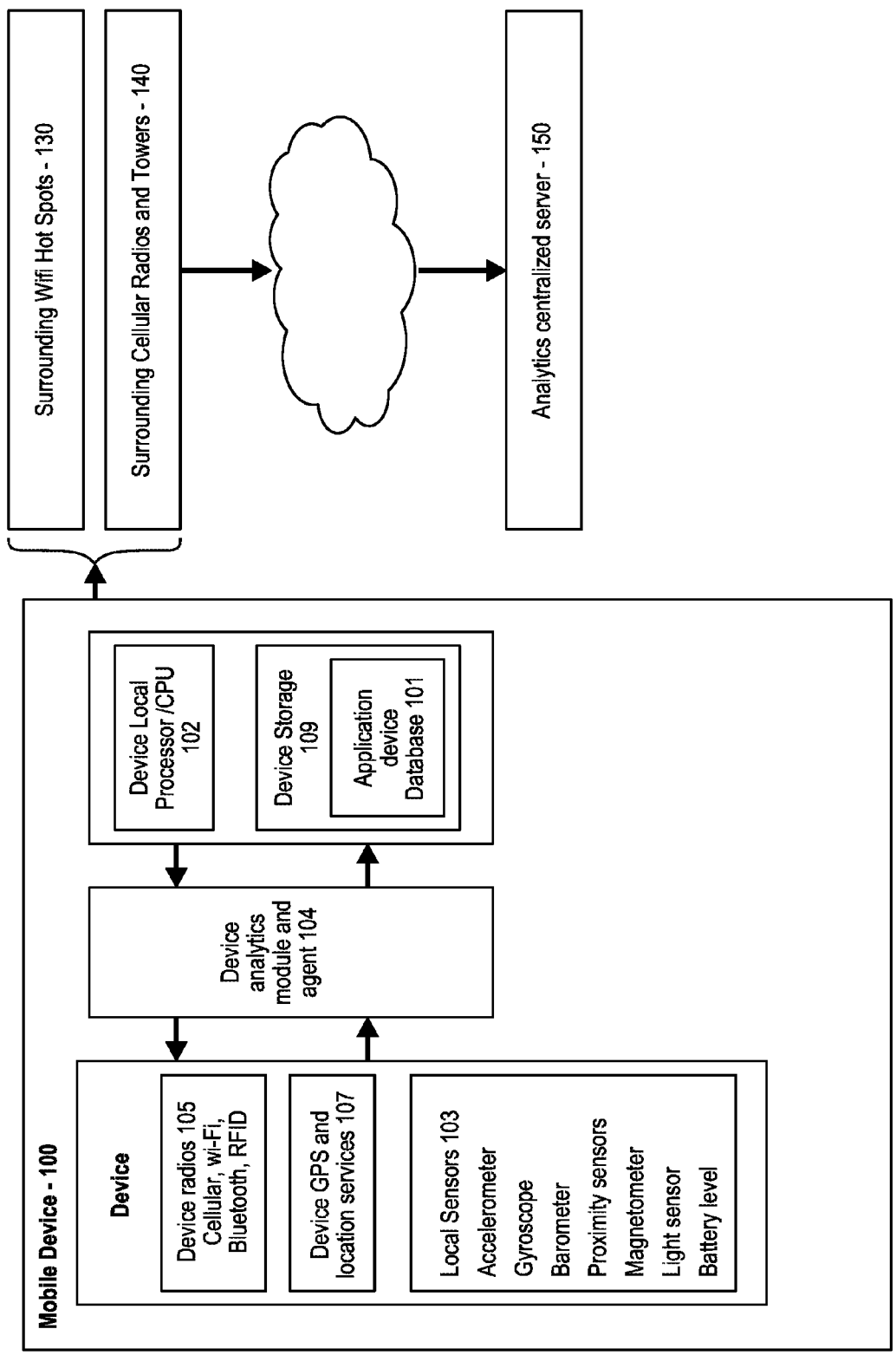
FIG. 1 is a block diagram illustrating an example mobile device associated with a driver and that collects driving information, according to an example embodiment of the invention.

A description of example embodiments of the invention follows.

The disclosed systems and methods can be used to manage driver profitability profiles for certain products and services and exchange of information with cloud-based systems. The methods and systems can generate information and profiles associated with routes driven or expected to be driven, targeted content delivery in anticipation of routes driven, and predict demographics and profitability of drivers or fleets of self-driven cars for specific products and services. The disclosed methods and systems can be used by various intermediaries, sales agents, brokers, ad networks, and service providers to determine and classify the potential profitability of certain individuals or groups of individuals or fleets of vehicles for specific products and service based on prior historical routes driven and to deliver to those individuals content or promotional offers and information tailored to those individuals' interests as calculated and determined based on the disclosed systems and methods that provide historical and predicted routes that those individuals have driven or are expected to drive using traditional vehicles, semi-autonomous vehicles, or fully self-driven vehicles.

An example system can include three parts. First, a software program residing on a mobile device containing instructions for the local mobile device CPU. The mobile device can convert, using the disclosed methods, a vast amount of location data points into a compressed manageable relevant metadata, such as, for example, routes or road segments, mileage, speed patterns, and time of day, to minimize data and bandwidth utilization. To further minimize data and battery usage, the software on the mobile device can operate in the background as a service to measure various on-board sensors and cell-ID changes in order to determine whether the device owner is in a vehicle and whether to initiate GPS measurements, which are more resource intensive. This enables the device to avoid collecting data if not in a vehicle to reduce battery usage from computation-intensive operations that are only needed while moving in a vehicle (e.g., there is no need to constantly calculate speed when the device is determined to not be in a moving vehicle).

Second, a program residing on a centralized processor can access a centralized database of driver profiles and compute various parameters of the driver behavior and store the routes driven, as well as various data elements that can be used to predict future routes based on historical driving habits. The central CPU can also determine estimates of the potential profitability of the driver for various products and services based on driving patterns, mileage, time on the road, speed, and other external factors, such as, for example, safety indices of roads travelled based on time of day, speed limits of road segments travelled, demographics (e.g., average income, home ownership) and zoning (e.g., residential, commercial, malls, industrial) of the areas travelled through, and the dominant general characteristics of destination points (e.g., malls, residential areas, office areas, medical centers, entertainment zone). A software module running on the central CPU can correlate various driving patterns with demographics and interests categories. For purposes of illustration and without limitation, a driver that travels on a regular basis to entertainment areas of a city late on Saturday nights can be categorized as a single, young individual or a recently married person without children. This demographic categorization can be taken into consideration when determining the profitability for various products and services. For example, a person categorized as young and single may be considered a high user of wireless data service or a subscriber to music services that are streamed on a costly and bandwidth-limited external wireless network. A feedback loop may provide over time the actual profitability of the drivers once they do purchase specific products or services. The actual results can then be stored in a centralized database, and profitability classification algorithm parameters can be fine-tuned and modified so that the profitability estimates converge towards the actual results.

The third part of the example system relates to creating a derived benefit to the drivers from background tracking. As with online cookies, the derived benefit requires a combination of convenience elements for the driver through the delivery of tailored content, promotional offers, advertising tailored based on captured route information and historical driving patterns, as well as encouraging drivers (e.g., using cash-back incentives) to allow themselves to be tracked by a merchant (e.g., insurance agent) without necessarily receiving discounts from the merchant or related entity (e.g., without necessarily receiving a discount from the insurance carrier selected by the insurance agent). To achieve this goal, all or a portion of the ad revenue from an always-on first party application on the device can be paid into a stored value account to the benefit of the driver. A sub-system of this component can provide advertising networks and ad exchanges route and destination data (such as, for example, most-travelled routes and corresponding time of day, most frequent destination malls or stores and corresponding time of day) in a format that can be used by advertisers and linked to the advertising identifiers of the mobile device. With this data, ad networks can enhance targeting capabilities of their platforms for the benefit of their advertisers. In addition, through data matching and synching between mobile advertising identifiers and desktop browser based third party cookies, the targeting capability that the ad networks can offer to advertisers can be extended and unified across both desktop browsers and third-party applications on mobile devices they serve, thus extending the capabilities of third-party cookies from tracking web sites visited to physical location visited.

The disclosed methods and systems provide a number of advantages depending on the particular aspect, embodiment, and/or configuration. One advantage includes providing driver profiles based on routes driven, which is information that has not been available before. The profile can be used in several ways, including the calculation of profit and risk potential of the driver for a wide variety of products and services. The profile can add new dimensions to the typical demographics categories obtained through other means. For example a "65 plus" year old or "retired" category can be nuanced by "stay at home" if no significant travelling is detected, "socially active" if several routes in residential areas is detected, or "traveler" if several road trips outside of the city is detected. This ability to amplify significantly the potential demographics of an individual using the patterns of the routes driven has tremendous value to several industries, as would be understood by those familiar in the art of inferred demographics to deliver targeted content, promotional offers, or advertising for third parties that may acquire access to those databases or when used in conjunction with ad networks if those demographics can be correlated to online traditional cookies from major ad networks or publishers.

Another advantage includes a system that can track route information in a way that is both battery efficient and bandwidth efficient in terms of reduction of the amount of data transmitted wirelessly on networks and cost in terms of network capacity. With GPS location being a high battery draining service, the system limits high accuracy location calculations to a minimum required to determine with the required level of accuracy for main parameters (e.g., mileage, average speed on segments, time on the road, and characteristics of destination points) that are required for the determination of the demographic profile and for the calculation of the predicted profitability for various products and services.

Yet another advantage is the ability to monitor fleets of self-driven cars or semi-autonomous cars and determine parameters for the calculation of predicted profitability for various products and services that the manufacturer or designer of the self-driven software and the manufacturers or designers of the n-vehicle sensors (e.g., cameras and proximity sensors) needed to deploy their fleet of self-driven cars, such as, for example, total mileage from the entire fleet, average speed on highways of the entire fleet, percentage of human override time of the entire fleet and put this information in an exchange and clearinghouse database accessible by various providers of products and services for those fleets such as insurance companies that may want some historical view on the performance of a particular self-driven software version and sensor configuration as it relates to road accidents and impact on liability insurance costs especially as it compares to the performance of alternative self-driven software and sensor configuration from another manufacturer or from the same manufacturer in order to better determine predicted future insurance costs and rate insurance services to fleets of self-driven vehicles using similar underlying technologies more accurately.

Further advantages include the build-up of a centralized database of key profitability parameters for several products and services outside of the ownership of the providers of such products and services so that the database can be leveraged across all players in a specific industry. Such a database can be viewed as an industry utility organization for the purpose of better targeting profitable segments of a particular market or declining high risk individuals. It can also force some providers to disclose information that has an impact on risks in a standardized way. For example, manufacturers of self-driven vehicles or operators of self-driven fleets may disclose a very high total mileage driven as well as a very low total cost from accident and liability claims; however they may not disclose that the vehicles were mostly self-driven on highways where it is easy to show high mileage with low claims, even with substandard self-driving technology. The availability of an industry-wide exchange and repository of route data would prevent such partial disclosure of information. The open architecture of the system allows wireless service providers, cable TV providers, medical products and service providers, ad networks, or insurance companies to connect and interface to the database to complement their perspective of a particular driver or fleets of self-driven vehicles with routes driven information and inferred demographics and profitability.

FIG. 1 is a block diagram illustrating an example mobile device associated with a specific driver that has stored in its device storage 109 code that embodies the functionality of a method for collecting driving information. FIG. 1 also illustrates a high-level architecture of an analytics module/agent 104 assisting data flow between a device storage 109, the device's local processor CPU 102, and an analytics centralized server 150, and device systems including device radios 105, device GPS 107, and device local sensors 103. The analytics agent 104 receives/collects data from the device systems that may be stored on the device storage 109 and a local application device database 101 or may be transmitted back to the analytics server 150 based on an algorithm that maximizes battery life and minimized amount of data transferred. The analytics agent 104 also provides a feedback mechanism by which data collection frequency in the device can be tuned. The analytics agent 104 has a background activity that collects those observation data at intervals of time that are determined by algorithms that are optimized to gather as many data points required for the inference pipeline that determines with high-level probability in-vehicle movement with the least impact on the device resources. This data collection activity can runs as a background thread on the device and does not block the normal functioning of the device. The software code residing in device storage 109 can cause the device processor 102 to periodically make measurements using various local sensors 103 using appropriate APIs to determine if the device (and its user) are in a moving vehicle. The measurements sequence requested by the instructions in the software may be such that it minimizes the use of location measurements that drain the battery or minimizes transmitted data over Wi-Fi or mobile networks.

The disclosed methods and systems may use all location methods available on the mobile device including, but not limited to, measurement cell tower ID and transmit/received power, location information provided by the device itself (based on services provided by the device itself such as GSP, Assisted GPS method, Standalone GPS method, Cell ID method, enhanced cell ID method using known sectorized cells IDs, the timing advance (e.g., difference between its transmit and receive time) and estimated timing and power of the detected neighbor cell (e.g., Wi-Fi triangulation methods using know local Wi-Fi hotspots) as well as accelerometer sensors of the device. The frequency of those measurements and the types of measurements made (some of which are more battery/CPU and data intensive than others) can be determined by the software residing on the storage memory 109 of the device. The cell ID, being available in most cases at little or no battery/bandwidth cost since it is used during the normal operation of a mobile device, can be used along with regular full location measurements, the frequency of which can be determined by the algorithm itself. Mobile devices typically are served by several specific cell towers nearby based on power measurements made by the device. Similarly, the device usually senses either a home or work Wi-Fi network (even when not communicating with those networks). The set of cell towers sectors ID and the broadcast SSID may be stored in a local database 101 along with a time stamp when the device starts and stops detecting those specific sector ID and Wi-Fi SSIDs—The program causes to assign a "known stationary location" on the application database 101 when it detects that the same ID information is repeatedly captured, which would indicate that the driver has reached a regular route start point (such as home) or regular route destination (such as work). This could be, for example, a home Wi-Fi SSID, the cell sector of a coffee shop visited regularly, or the Wi-Fi of a relative or friend where the driver spends a significant amount of time. Because of the small coverage area of Wi-Fi hotspots compared to cell ID, the device analytics module and agent 104 can collect data from other sensors' measurements when it detects a loss of connection with a known stationary location Wi-Fi SSID. At that point, the algorithm can trigger more-precise location measurements (such as frequent and large change in linear acceleration movement or changes in angular rotational velocity, or sustained changes in directions as measured by the accelerometer, gyroscope, and magnetometer sensors 103) to determine whether the device is in motion. Once the probability of in-vehicle movement is high enough for GPS measurements, data collection starts at a much higher frequency and an in-vehicle status is sent to the analytics centralized server 150. The threshold for speed and acceleration for an in-vehicle determination (and corresponding switch to a status of more constant tracking of location and speed using GPS and other location services) is important for reducing the bandwidth and battery drain on the device. Similarly, a deceleration and a stop in movement may cause the device to return to a state of reduced tracking intensity after a certain period of time of reduced movement. In one embodiment, in-vehicle status may be set directly by the user or by in-vehicle transmitters (e.g., Bluetooth, RFID) that connect to a corresponding radio 105 and in-vehicle presence of the mobile device and its owner.

Figure 2:
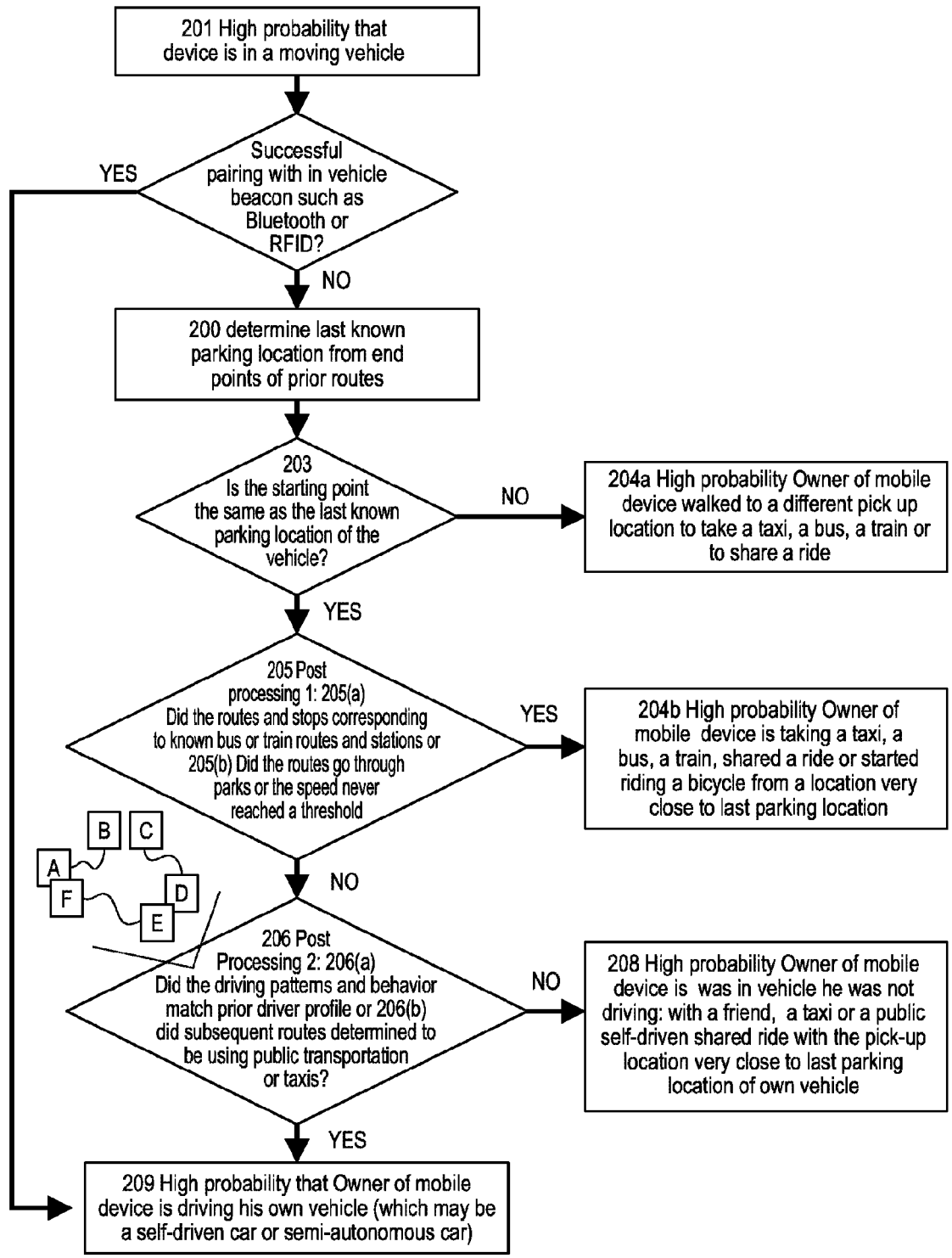
FIG. 2 is a flow diagram illustrating determining whether the user of a mobile device is driving a vehicle, according to an example embodiment of the invention.

FIG. 2 is a flow diagram illustrating whether the user of a device is driving a vehicle. If it is determined that the device owner is in a moving vehicle (2-01), a message may appear on the device asking if the user of the application is driving his own vehicle or if he/she is moving in a taxi, a friend's car, a public self-driven car, a bus, a train, or a bicycle. If the message is ignored an attempt would be made to pair the device with the owner's vehicle known internal beacons such as Bluetooth or RFID (2-02). If the pairing is not successful (e.g., because such beacon is not available or because phone settings are not allowing such pairing), then in some embodiments it may still be important to determine if the driver is driving his own car or is a passenger in someone else's car or a passenger in public transportation (e.g., train, taxi, bus, or shared ride on self-driven car). It is beneficial to determine if the owner of the mobile device is driving his own vehicle without the need for costly pairing technology in the vehicle. Linking the owner of the device to a specific vehicle and to specific routes can provide valuable data to determine interests and profitability for certain products and service. For example, in order to calculate the profitability of the driver for auto insurance, it would be important to ignore mileage from routes travelled in a bus, whereas to calculate the profitability of a driver for wireless connectivity, it would be important to actually know if a long route is made on a bus or a public self-driven shared ride as the probability that the owner of the mobile device uses his or her phone for data intensive applications while sitting in a bus or in a self-driven shared ride is quite high, thus reducing the overall profitability calculations for that particular service as calculated by the central server.

To differentiate between different scenarios, the last known parking location may be determined from the end points of prior routes (2-00). This determination is done by looking at the end point of the prior route giving higher confidence to the home and work locations (e.g., home being where a specific device stays overnight several times in a row stationary or where it gets connected overnight to a specific Wi-Fi network, and work being where the same event occur but during weekdays mornings or afternoons). The start point of the route is compared with the last known parking location of the vehicle (end point of prior route) (2-03). One option is to verify if the start point of the new route is within a specific distance form the last known parking location of the usual vehicle used. If the distance is above a specific threshold, it may be assumed that the probability of using public transportation or a ride with a friend in different vehicle is significant and the mileage of the new route can be categorized as such. The last location of a route is, thus, important to associate a specific vehicle to a specific driver, and the last location of a vehicle is expected to be the start point of the next trip.

Even if the distance between the last known parking location and the start of the new route is below a specific threshold it still cannot be assumed with enough certainty that the driver is not using his/her own vehicle. The following determinations may be made once the new route is completed on the centralized server. Several retroactive analytical determinations may be made retroactively to determine if the route was completed using the device owner's vehicle or through other modes of transportation. At retroactive comparison step (2-05), the system compares the new route with the known routes and stations of surrounding trains and buses, and if the route and the stops match within a specific confidence factor with known public transportation routes, the new route will be categorized as such for the profiling and profit determination algorithms (2-04). If no public transportation route matching is achieved, a subsequent step (2-06) considers both driving pattern and whether subsequent start points of the following routes are determined to imply the use of a different vehicle. In 2-06a, driving pattern is tested against usual speed (unusually high or low average speed compared to past measured behavior indicate a different driver) and unusual routes: capturing several route segments for the same driver show a pattern of repeat preferred routes routinely taken by the driver and vehicle so that some routes (e.g., a drive to the mall) are associated with a confidence score being of a particular level of being driven by the same driver. If the route to a specific usual destination does not meet that confidence threshold, the assumption will be that the driver of the vehicle is different (e.g., a friend, another family member, a taxi driver, or a self-driven car) (2-08). In 2-06b, the post processing may be done not only on the new route but also on subsequent routes. If a new route segment AB is initiated "close" (distance beyond a certain threshold) from the last known parked location A, temporarily conclude that the driver is in the vehicle and trace new route segments AB. But if the assumed last parked location of this new route segment point B is far from the next departure point on the next route segment (point C), and this occurs potentially a multitude of times (end point D of route CD is far from start point E of segment EF), and the last known end point location point F is very close to one of the last known parked locations in the system (point A) then all the intermediate road segments (AB, CD, and EF) can be removed and not associated with the vehicle as it is assumed the person was, for example, in a taxi or riding with a friend in a different car.

FIG. 3 is a schematic diagram illustrating a system for collecting driving information and classifying drivers. Various connections between elements are described in the following description. These connections are general and, unless specified otherwise, may be for example direct or indirect, wired or wireless, and this specification is not intended to be limiting in this respect. In the description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure. The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In FIG. 3, an interactive system 300 is shown for use in connection with the classification of interests and profit potential for various products and an action-less points delivery system to encourage tracking permissions, according to an example embodiment of the present disclosure. The interactive system 300 provides points that drivers can convert to cash, determines interest attributes and profile of drivers based on historical routes driven and calculates dynamically profit potential of certain drivers or fleets of self-driving vehicles for products, such as auto insurance, life insurance, wireless services, medical products, etc. The points are provided to drivers simply for driving the roads they already drive, so there is no specificaction requested from the driver in order to receive such cash convertible points. In one embodiment, the interactive system 300 can also classify drivers into groups or risk pools based on loss ratio prediction for car or vehicle insurance as predicted by the routes driven and other data captured by the system. The classification is dynamic in that it can change over time as additional data is captured dynamically and processed by the interactive system 300.

The system 300 includes a centralized system server, shown as vehicle portal server 307a. The computing device 307a may include one or more processors, which may execute instructions of a computer program to perform any of the features described herein. The instructions may be stored in any type of computer-readable medium or memory, to configure the operation of the processor(s). For example, instructions may be stored in one or more of a read-only memory (ROM), random access memory (RAM), internal or removable media, such as a Universal Serial Bus (USB) drive, compact disk (CD) or digital versatile disk (DVD), any type of disk drive, or any other desired electronic storage medium. Instructions may also be stored in an attached (or internal) hard drive. The computing device 307a may include one or more output devices, such as a display (or an external television), and may include one or more output device controllers, such as a video processor. There may also be one or more user input devices, such as a remote control, keyboard, mouse, touch screen, microphone, etc. The computing device 307a may also include one or more network interfaces, such as input/output circuits (such as a network card) to communicate with an external network 306. The network interface may be a wired interface, wireless interface, or a combination of the two. Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. Server 307a is further connected to (or includes) a mass storage device 307b and 307c, noting that the mass storage device may be coupled to the server 307a via a communication link. The mass storage device contains a store of navigation data and map information, and can be a separate device from the server 307a or can be incorporated into the server 307a.

The device 310a can be a system with its own memory resource(s) that comprises, for example, a volatile memory, such as a Random Access Memory (RAM) and a non-volatile memory (e.g., digital memory, such as a flash memory). Connections to the device 310a can be a wired or wireless connection to any other external device, such as a car stereo unit for hands-free operation and/or for voice activated operation, for example, for connection to an ear piece or head phones. The mobile device's connection may be used to establish a data connection between the mobile device 310a and the internet via a wireless macro network (e.g., 3G, 4G HSDPA, etc., and future generations thereof) or any other network, for example, such as a Wi-Fi network or any future generation thereof, and/or to establish a connection to a server via the internet using some other network, for example, such as an internet connection. For the example embodiment, an internet connection between the server 307a and the mobile device 310a is established.

The server 307a hosts a driver profile and a profit or risk profile database 307b and the interest or demographics database 307c where factors affecting the profitability of several products are stored. For example, in one embodiment, the information stored for auto insurance may be any or all of the following: total miles driven, percent of drive time during night time, average speed (normalized for road speed limits), the risk score of the areas where the driving occur (as normalized by past incident databases in those areas), and estimated loss ratio for future insurance at various rate levels. In another embodiment, the information stored for medical products may be any of: mileage during weekdays, number of routes to known malls, pharmacies or medical buildings, and average speed. In another embodiment for wireless services: total time outdoors or number of routes to entertainment areas, such as bars or malls containing movie theaters. In another embodiment, for liability insurance fleets of self-driven cars, the data stored can include total mileage of the entire fleet containing the same software version and sensor configuration as well as the risk factors of the areas driven by the entire fleet as adjusted or normalized for various area specific risk factors. The Profile database 307c may contain the classifications that are derived from routes driven. The classification categories may be similar to those used by major ad networks but new categories can also be created to reflect additional data from routes that are not yet captured in traditional demographics classifications used by ad networks. In one embodiment, such a new category can be, for example, "drives most of the time in the afternoon." The vehicle portal server, referred to herein as server 307a, generally corresponds to one or more computing systems configured to compute, store, and process data associated with one or more drivers or fleets of self-driven vehicles, as well as data associated with merchants of interest to those riders and data provided by products and service providers such as actual profitability of drivers that were purchased their products or services. In one embodiment, such data can be claims data for auto insurance or data consumption for wireless services. Such computed data can be stored in the driver and profit and risk profile database 307b. The server 307a receives from any of a plurality of data providers 305a-d, described below, supplementary data that, when combined with geolocation dynamic data originating from drivers 310a or fleets of vehicles 308a, allows for the delivery of points to drivers driving along specific route segments and the classification of drivers in specific insurance risk pools. In the embodiment shown, the server 307a may be accessible by any of a plurality of drivers' mobile devices 310a (e.g., a mobile phone or tablet device) and the routes driven by their associated vehicles 310b as well as by all the centralized controllers 308a and their associated fleets of vehicles 308b. An application installed on a mobile device 310a may be required to communicate with the server 307a and transmit data such as encoded route information or receive messages and content from a merchant's computing device 309. No application may be required on the fleet of vehicles 308b as the data captured along the routes driven can be communicated using an encoded format to the centralized controllers 308a of the fleet and then to clearinghouse 308c that connects all the fleets from several self-driven car technology vendors to the interactive system 300. Although only cars are shown in the embodiment illustrated in FIG. 3, it should be understood that other types of vehicles could be used as well, such as trucks, vans, or commercial vehicles, according to the various aspects of the present disclosure. The server 307a is also accessible via a plurality of other computing devices, such as computing device 310c having a web browser installed thereon and which can be associated with the driver's mobile device 310a. In the embodiment shown, a plurality of third-party data services is integrated with the information used by server 307a to provide the cash convertible points and ads that should be delivered along certain routes and to classify the drivers in profit/risk pools. In the embodiment shown, the data providers 305a-d include: (1) A map data provider 305a that includes, when available, speed limits information. The map data provider 305 a delivers map services to the server 307, with which various data overlay services can be provided including traffic data, turn-by-turn directions in case the driver decides to visit one of the advertising partners, GIS data, or other types of information, such as speed limits on various roads and mileage between two points on the map along a specific road segment; (2) A geocoded database showing frequency and severity of road accidents from data provider 305b such as police reports and accident reports; (3) An advertising data provider 305c capable of delivering ads that target certain driver profiles as determined by the server 307a based on the historical routes driven by the drivers 308a or capable of providing ads of interest for the specific roads typically driven by the drivers 308a; and (4) A data provider owned by product and service companies 305d. In one embodiment, an insurance carrier data provider providing bids for commissions levels on specific groups of profit/risk classified drivers associated to their vehicles 310b or a wireless service company providing bids (e.g., fees they would be willing to pay) to access the database 307b to market specific wireless data to specific profit/risk classified driver groups, using an application residing on the mobile device 310a. Data providers 305d in addition to providing bids for commissions or access fees also provide, over time, profitability data such as data utilization or claims data for the drivers that have selected their products in order to improve the classification of drivers into separate profit/risk pools. In addition to product and service data providers, intermediaries, brokers, agents may store in database 307b additional information about the vehicle 310b and the driver using applications running on mobile device 310a to present forms or questionnaires at various points in time and as needed. This additional information can be linked to the route information in order to better classify the drivers and their associated vehicles in profit/risk pools.

In some embodiments, merchants using specific ad networks can deliver cash convertible points to the driver's accounts based on some route driven. In some other embodiments, the advertising data provider 305b delivers advertisements to users who are drivers using an application running on mobile devices 310a. In other embodiments, once the profile of the driver is associated with third party cookies left on a driver's computing device 310c using, for example, the systems and methods described in FIG. 9, interest based advertising can be delivered on the computing device 310c as the driver browses the internet on that device. The advertising systems of the present disclosure can take many forms. For example, in some cases, when a particular route is being driven, advertising corresponding to businesses located along that route can be displayed to the user. In other embodiments, personalized content is downloaded in advance in anticipation of the user driving along specific routes. In other embodiments, the delivery of the cash convertible points is not related to the merchants along specific routes but is related to the driver's profile determined by the server 307a and stored in the database 307b that is related to the market segment the driver belongs to as inferred by the routes typically driven by the driver (e.g., example routes driven frequently on a Saturday night that end in areas with several bars can infer a single/youth market segment). In all such cases, the advertising and cash convertible points providers 305c use server 307a to publish targeted content on the mobile device running a specific application or to access for a fee the driver profile residing in database 307b. Also, as illustrated in FIG. 3, the various data providers, drivers, and vehicle fleets may be communicatively interconnected with the server 307a via a network 306, such as the Internet. Additionally, such a network may be used by users of mobile computing device 310c or merchant computing devices 309 for communicative interconnection to the server 307a.

Figure 4A:
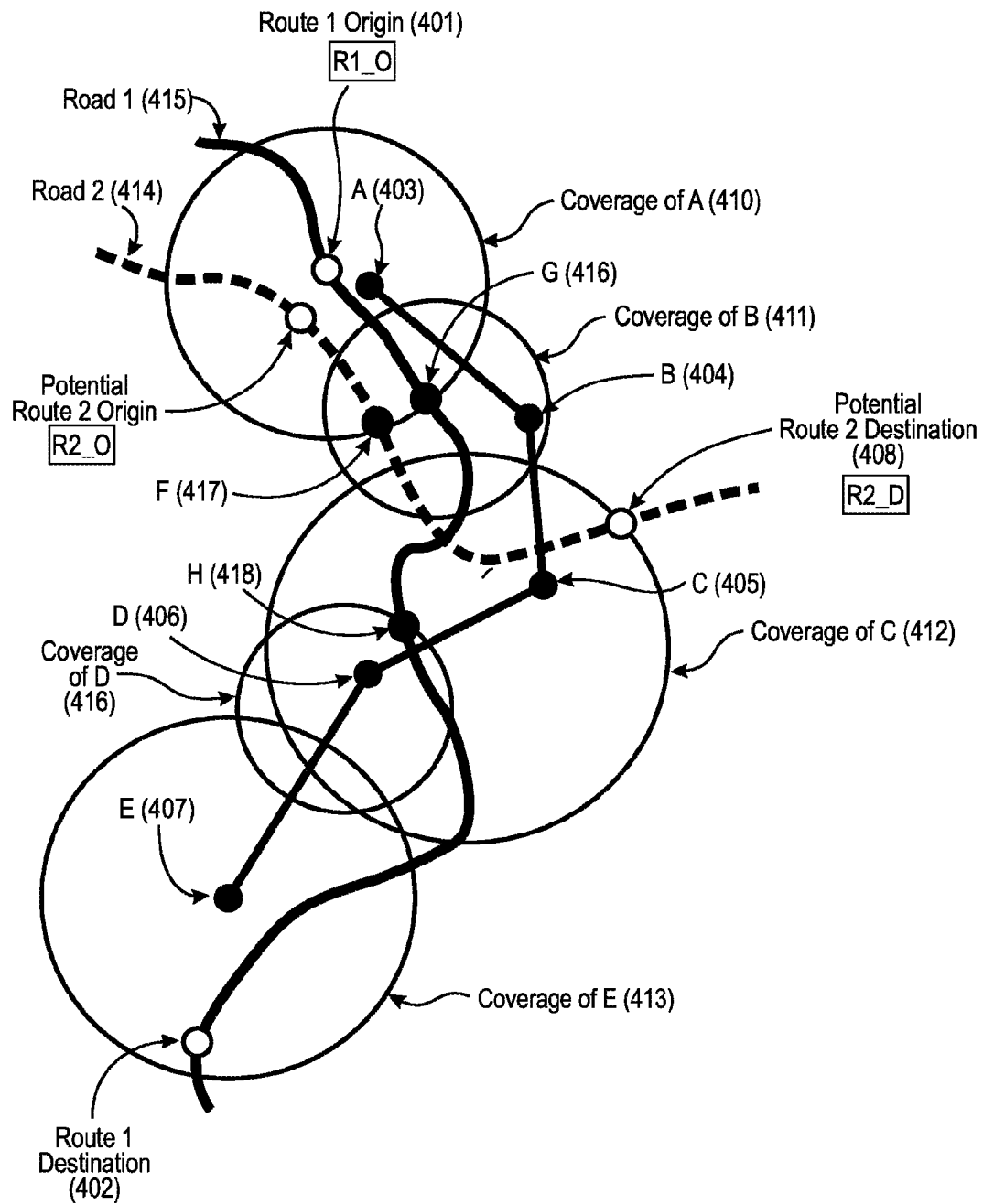
FIGS. 4A and 4B are schematic diagrams illustrating minimizing battery and bandwidth utilization and minimizing an amount of data transmitted wirelessly by a mobile device, according to an example embodiment of the invention.

FIG. 4A is a schematic diagram illustrating minimizing battery and bandwidth utilization and minimizing the amount of data transmitted wirelessly by the driver on costly outdoor wireless networks. In many embodiments, GPS may not be set during specific road segments, and a location feature of the driver's mobile device may be turned off. Either because the driver chose not to use GPS while driving or because the system has determined that it has stored sufficient prior routes in the area being driven that it can determine a route path with a high degree of confidence despite using a much lower accuracy location method (but less battery draining and more bandwidth efficient). In this example implementation, cell tower ID and network-based triangulation based on power received by the device and time advance measurements from several cell sectors being monitored by the device during the normal course of operation on the cellular network can be used to map approximate locations that can be snapped-to most probable roads on a map using matching that takes into consideration, for example, the importance of the roads, the probable destination of the driver based on past behavior, and the probable route used by the driver based on previous route observations. Once location data points have been snapped to location points on a road segment, those location data points can subsequently be used first, to determine mileage and distance, and second, to approximate average speed as instantaneous speed may not be available considering error probabilities of the location information. For example, in FIG. 4A, a user does not permit high-accuracy GPS location methods, and the system must rely on network-based technologies, such as cell ID or cell ID with time advance, to determine a route with high confidence. A vehicle has its location captured by cell towers or sectors A 403, then B 404, then C 405, then D 406, and then E 407. Because the only roads going through the coverage 410 of cell A 403 and the coverage 411 of cell B 404 are road 1 415 and road 2 414, then the driver is assumed to be on one of those two roads and the point of origin would be in the segment of those roads included in coverage 410 of cell A 403. The system assumes an approximate point of origin being snapped to the roads at either point R1-O 401 or R2-O 409. If the system has stored a usual route along road 1 415 going from R1-O 401 to R1-D 402 from prior measurements based on high accuracy GPS, then the system calculates a high confidence factor that the vehicle is travelling along road 1 415 through the points R1-O 401, then G 416, and then H 418, as opposed to road 2 414 through the points R2-O 409, then F 417, and R2-D 408. As the vehicle is captured by the coverage 416 of cell D 406, the system calculates an even higher confidence factor that the vehicle is on road 1 415, because road 2 414 is not within the area of coverage 406 of cell D 406, and determines that the driver is along a usual road previously stored road 1 415 with a previous destination point on point R1-D 402, which can be confirmed when the vehicle is registered on cell tower E 407. If the driver had no prior usual roads stored, then the system can approximate distance and speed based on a road segment travelled along the points A 403, B 404, C 405, D 406, and E 407 based on approximate known coverage of those towers and existing roads within the coverage to determine the most likely road taken that has the highest road traffic and snap the path ABCDE to a route along roads covered by those cell towers or sectors.

Figure 4B:
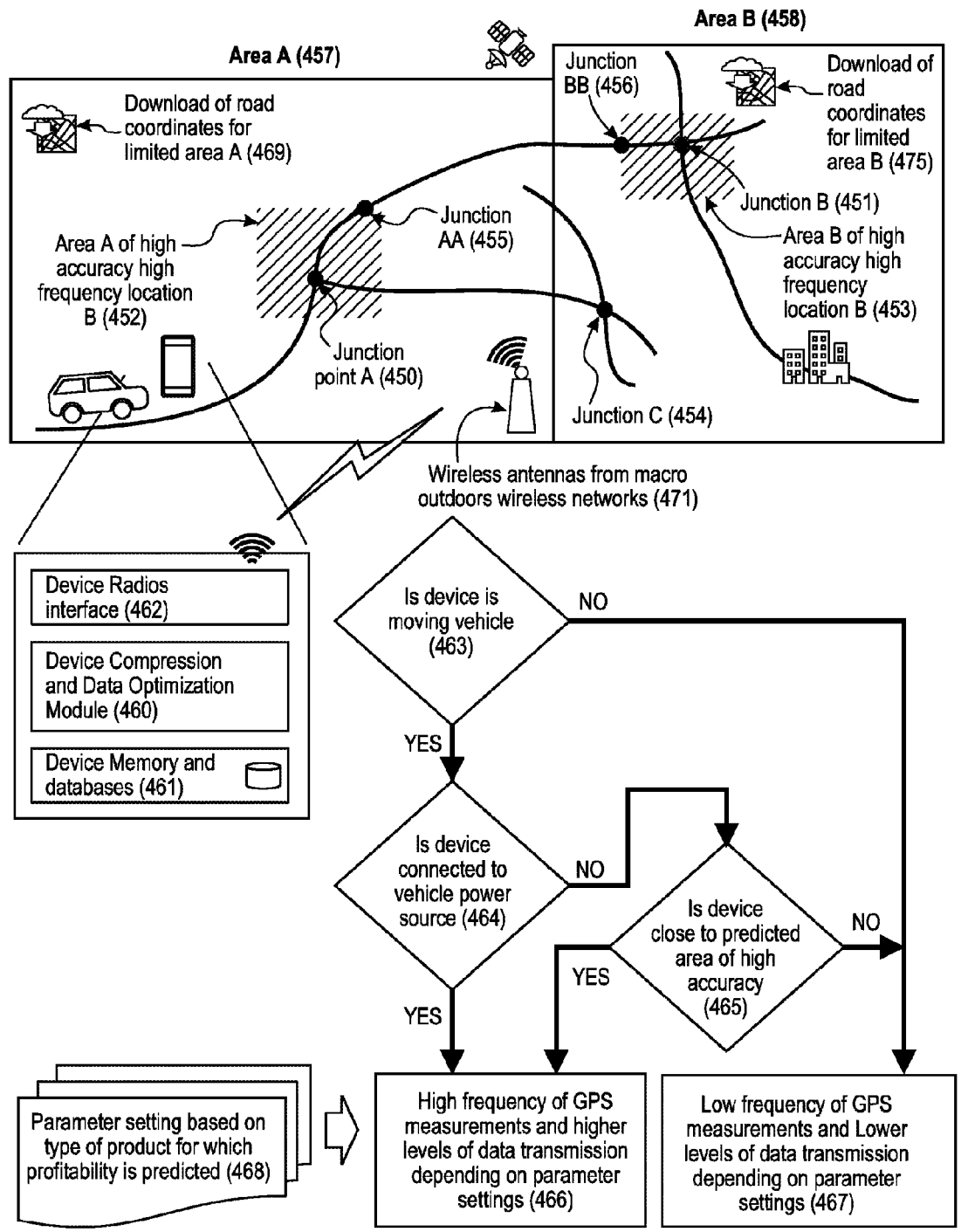

FIG. 4B is a schematic diagram illustrating an example embodiment that reduces battery usage and data collection and transmission activity. Such reduction can be managed by a software compression and data optimization module 460 residing on a mobile device. The module monitors several device characteristics, such as battery level, power level and signal quality of surrounding networks (e.g., Wi-Fi or cellular network), phone status as determined by the application stationary or in movement in a vehicle, time of day, and connection to a power source. One of the module's main functions is to regulate the frequency of the GPS measurements and amount of data received and transmitted back to a central server of the system.

Significant reduction in data transmitted is possible with an example objective of predicting demographics and profit/risk potential for various products and services as measurements of, for example, location, speed, and mileage need only be approximate. In one embodiment, the frequency of GPS measurements and frequency of data transmission (real time versus delayed) is determined by a centralized server based on the type of product and service for which profitability is being predicted 468. The data compression and data optimization module 460 can execute computer codes to regulate the amount of data collected and transmitted on outdoors wireless networks and the amount of device CPU utilization based on a level of precision required to estimate routes driven, mileage, and speed as pre-determined by an accuracy thresholds setting set by the system and sent over wireless networks from time to time. Those parameter settings 468 can be stored in the device memory and database 461. In one embodiment, the code on the device executes a first step for optimization to determine if the vehicle is moving 463, if yes, the device compressions and data optimization module causes the device to detect if it is connected to the vehicle 464 or to determine if the last known location is approaching the boundaries of predicted areas of high frequency location 456. Those areas are determined by the central server of the system and are around each road junction where the driver needs to make a decision as to which road to take. The increase in accuracy in location determination within those specific areas is necessary to be able to significantly reduce measurements and data transmission as soon as the driver exits those areas 455. The coordinates of those areas of high accuracy as well as the coordinates of the roads surrounding the last known parking location 469 are downloaded in preference on Wi-Fi and while the driver is located at home or work or any other long term origin or destination point. This reduces data transmission and bandwidth utilization on outdoors networks and reduces battery consumption while the device is located in an area close to antennas and transmitters so that the device does not have to use strong power levels to transmit or download data over longer distances. Once a driver exits those areas, as per FIG. 4B while driving on segment Junction AA 455 to Junction BB 456 which is the entry point of the next area, area B 453, of high frequency measurements, various parameters (e.g., path, speed, and mileage) that are required for profitability prediction algorithms can be determined with very low frequency location measurements since the road segment from Junction AA to Junction BB is the only road segment between the two points and the path and distance on this road segment is provided by map providers that may be accessed by the system. Since most roads have already been geocoded by map providers, the path and distance between two road intersections is known, so the distance and average speed between two intersections can be determined without many intermediate measurements. In some embodiments however, the areas of increased location measurements as determined by the central server can be increased or decreased, or additional areas along the path between two road intersection points can be inserted depending on the classification of the driver. In one example embodiment, the central server software configuration may cause the areas of high frequency high accuracy monitoring to change, or new ones to be inserted if the driver is classified as a high risk from prior route analysis for insurance purposes. In such example embodiment, intermediary areas of higher frequency and higher accuracy measurements may be required to monitor sudden acceleration and sudden burst of speed between intersection points, such as while driving along segment Junction AA 455 to Junction BB 456. In another example embodiment, the prior classification can be based on too-limited set of route information, perhaps because the driver is a new user of the device-based application and the ability to predict habitual routes or driving patterns has not yet been established. The ability to modify how and when the driver's driving patterns are being tracked and monitored and to increase or decrease the frequency and/or the accuracy of location measurements based on a prior classification of the driver related to the predicted profitability for certain products and services, increases the accuracy of such classification while minimizing as much as possible battery usage and data transmission. If the classification is validated over time as being high risk, the centralized system can send targeted messages to the mobile device of the driver encouraging changes in driving behavior that may result in a re-classification of the risk and predicted profitability for various products and services.

Furthermore, additional compression of data can be used in order to avoid costly data transmission of promotional content expected to be published or listened to while on the road. Content can be audible or visual displayed messages from merchants and service providers along a route that matches prior visits or matches potential interest of the driver or matches an advertising potential as set by a centralized processor responsible for selecting merchants (e.g., popular franchises, popular department stores, or points of interest). The device compression and data optimization module 460 can use algorithms to cause transmitters 462 to attempt to send a small data set to the centralized system server and to do so in bulk and in a compressed format. Some embodiments achieve this objective by taking advantage of known usual or habitual routes that a user will likely take in the future and requesting and receiving content for those routes while the vehicle has stopped, and the driver has been connected to one of its usual Wi-Fi hotspots, such as a home, work, or coffee shop hotspot. For example, in FIG. 4B, if Junction point A 450 to Junction B 451 is a usual route, content related to that segment may be downloaded prior to the driver being on the road, while at home, while no content would be downloaded in advance if it is related to route Junction Point A to Junction C 454 as this route (A to C) is rarely taken. Much of the data captured on prior route and much of the data that is expected to be used during the next expected route (as predicted based on prior historical route analysis and time of day) can be stored in device memory and database 461 and captured data may be transmitted preferably back to the central system server while the device is stationary.

In FIG. 4B, it is shown that the general macro area in which the device is generally located can be divided into areas (such as area A 457 and Area B 458, and when the device is, for example, located in area A 457, the coordinates 469 of the roads in area A can be sent to the device at the appropriate time before entering that area and the coordinates of the roads travelled while in area A can be sent to the server at an appropriate time while in areas of high data transmission, such as areas 452 or 453, or while exiting the area. To further reduce data packets, the local road map may be in the form of geocoded information compressed at an appropriate resolution of location accuracy and sampling frequency to obtain an approximate estimate of distance, speed, and direction based on a required parameters set 468.

While driving along usual routes at usual times of the day, the system may assume that the commute is fixed and the data collection module 460 can cause the capture of a sample of a limited set of data and encode it appropriately, for example, a small sample of data collected at the junction points and various cell ID measurements instead of GPS measurements may be enough to verify and reconstruct with a high degree of confidence the entire route. Speed can also be reduced in minimum data sets. Route segments travelled at approximately constant speed may not transmit all the instantaneous speed along the road, but a single average speed along a beginning point and an end point provided that a standard deviation from this average speed is relatively small. In many cases, when the driver has been repeatedly classified as low risk for certain insurance products or high profitability for certain data products, average and actual speeds do not need to be constantly compared to speed limits on the road segment travelled, and if it is within speed limits for the roads travelled during the measured samples, the respect of speed limits on entire road segments may be assumed as a continuous real-time measurement of speed would have a negligible impact on inferred profitability of the driver for various products and services. There may also be other metrics associated with driving along the a route that is captured in encoded form in addition to speed and route, such as, for example, acceleration, deceleration, time of day/week/month, and cumulative averages such as cumulative mileage. Such collected data can be compressed by the data compression and data optimization module 460 and may be stored in any appropriate format on the device, such as a dynamic cookie or other persistent identifier that can be linked to the advertising ID of the device, such as, for example, an Android advertising ID. This information can be stored in the device storage and database 461 in a SQL lite structured database, for example. The data compressions and data optimization module 460 uploads the encoded data to the centralized system server when an efficient network connection is available, a threshold of data collection is reached, a threshold of local memory utilization has been reached, or a preset time interval has been reached.

Figure 5:
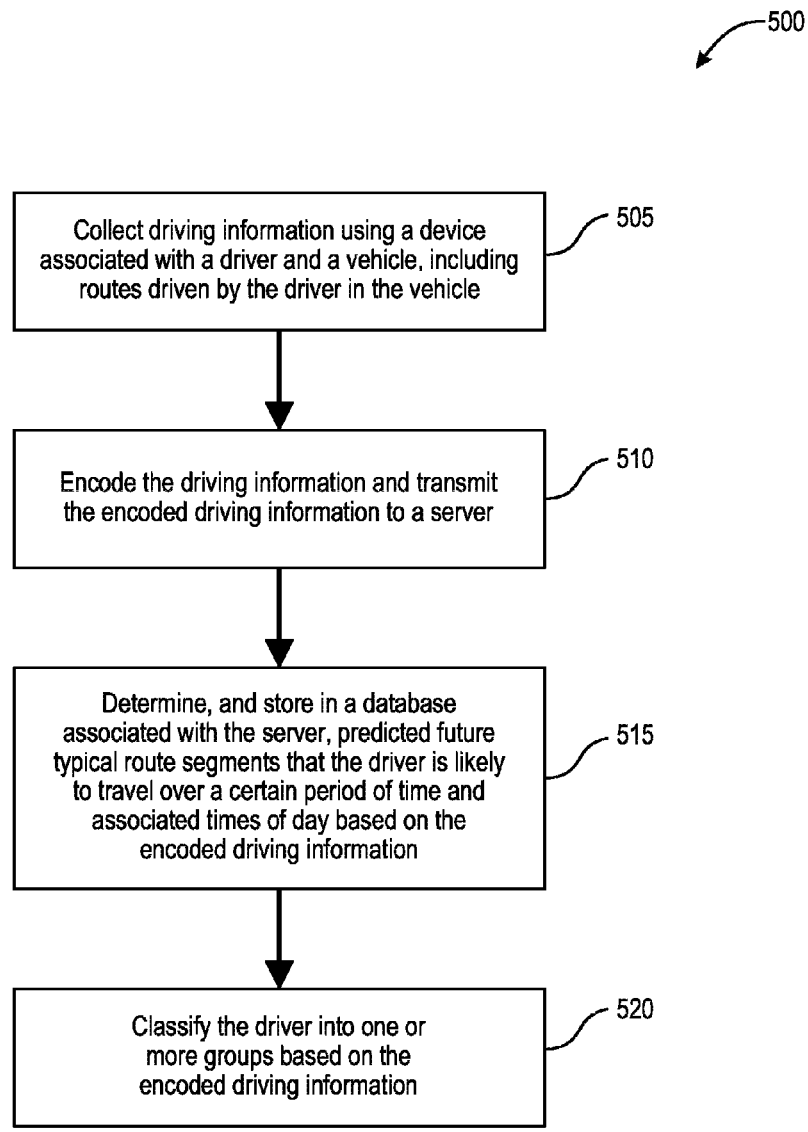
FIG. 5 is a flow diagram illustrating collecting driving information and classifying drivers, according to an example embodiment of the invention.

FIG. 5 is a flow diagram illustrating collecting driving information and classifying drivers, according to an example embodiment of the invention. The example method 500 includes collecting 505 driving information using a device associated with a driver and a vehicle. The driving information includes routes driven by the driver in the vehicle, and can also include mileage, time of day, and speed. The collection of the driving information can be enabled and disabled based on location and movement of the device. The method 500 further includes encoding 510 the driving information and transmitting the encoded driving information to a server, determining 515, and storing in a database associated with the server, predicted future typical route segments that the driver is likely to travel over a certain period of time and associated times of day based on the encoded driving information, and classifying 520 the driver into one or more groups based on the encoded driving information.

Figure 6A:
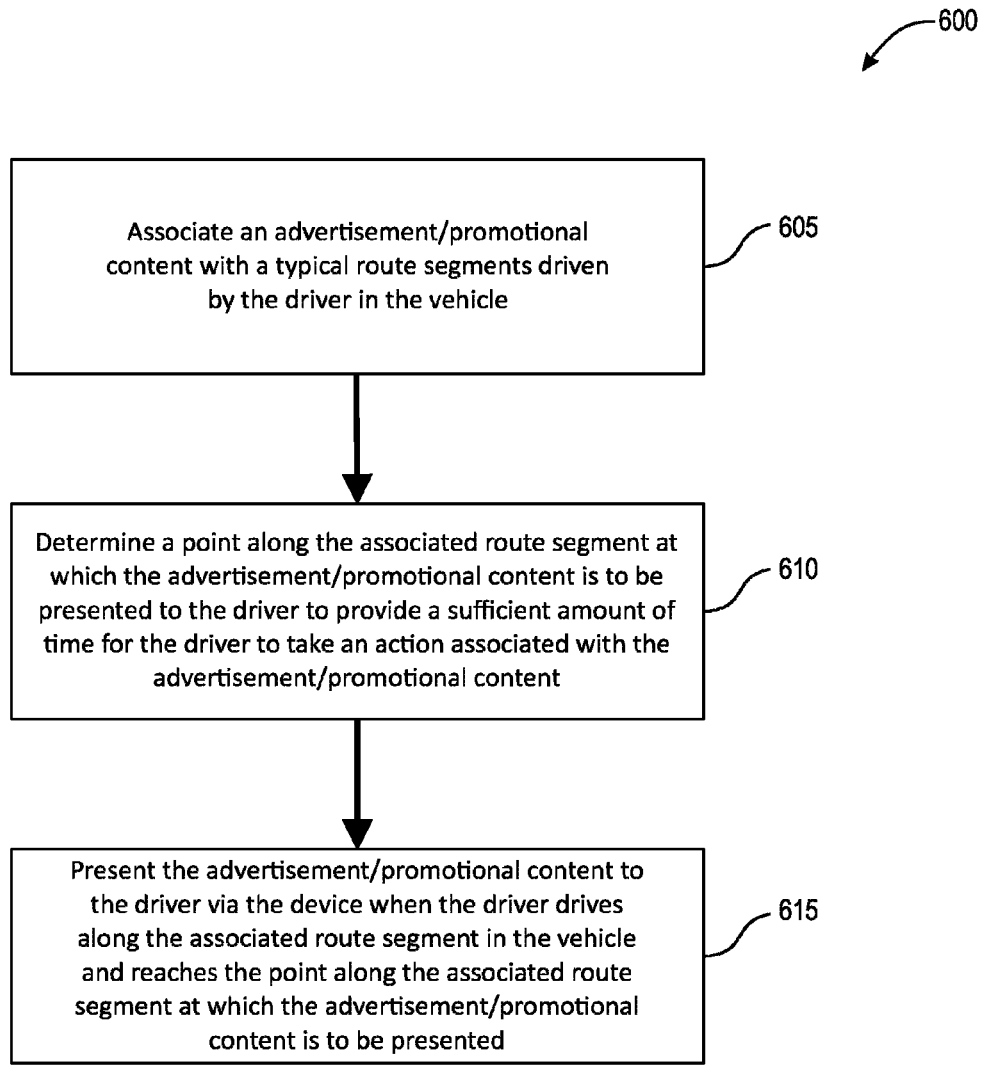
FIG. 6A is a flow diagram illustrating presenting an advertisement or promotional content to a driver based on collected driving information, according to an example embodiment of the invention.

FIG. 6A is a flow diagram illustrating presenting an advertisement or promotional content to a driver based on collected driving information, according to an example embodiment of the invention. The example method 600 includes associating 605 an advertisement or promotional content with at least one of the typical route segments (e.g., driving information collected by the above example method 500) driven by the driver in the vehicle. A point is determined 610 along the associated route segment at which the advertisement or promotional content is to be presented to the driver to provide a sufficient amount of time for the driver to take an action associated with the advertisement or promotional content, and the advertisement or promotional content is presented 615 to the driver via the device when the driver drives along the associated route segment in the vehicle and reaches the point.

Figure 6B:
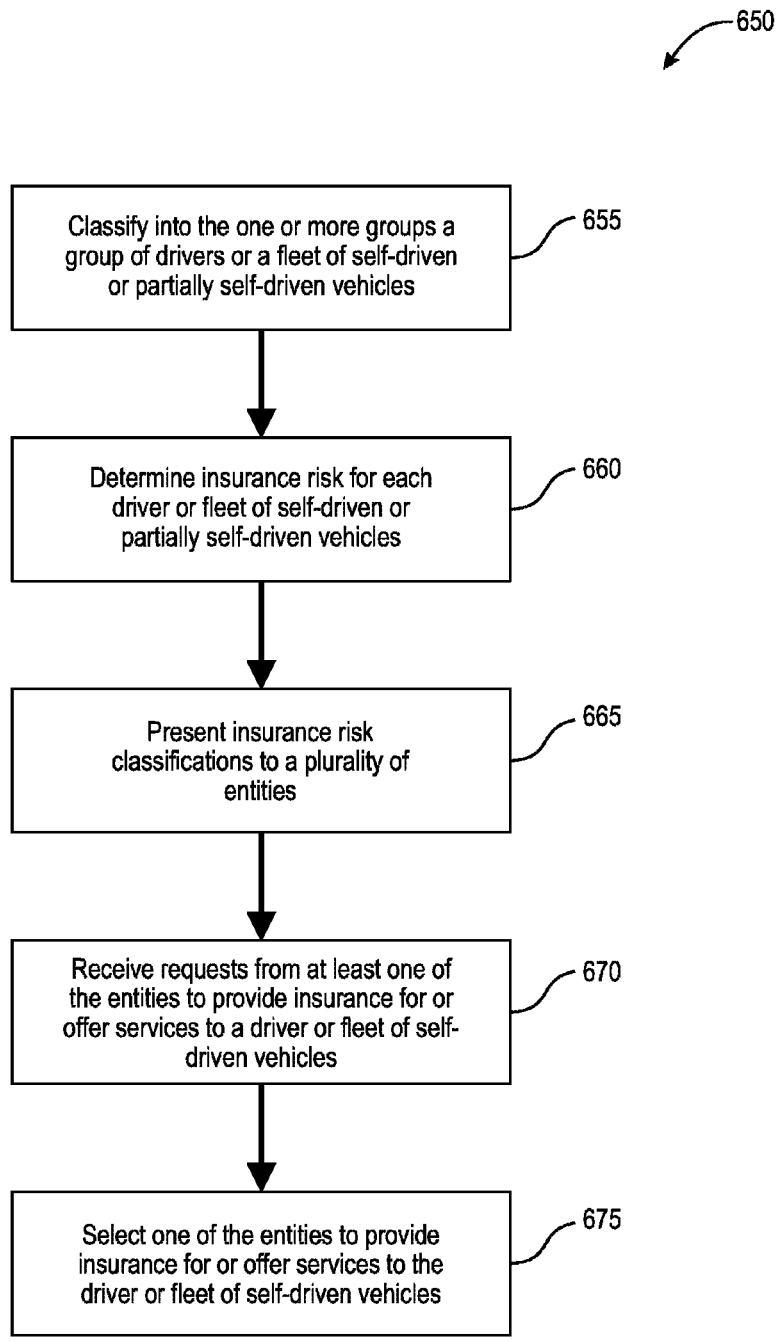
FIG. 6B is a flow diagram illustrating determining insurance risk for a driver or fleet of fully or partially self-driven, according to an example embodiment of the invention.

FIG. 6B is a flow diagram illustrating determining insurance risk for a driver or fleet of fully or partially self-driven, according to an example embodiment of the invention. The example method 650 includes classifying 655, into one or more groups, a group of drivers or a fleet of self-driven or partially self-driven vehicles, and determining 660 an insurance risk for each driver or fleet of self-driven or partially self-driven vehicles based on driving information of the driver or fleet of self-driven or partially self-driven vehicles (e.g., driving information collected by the above example method 500). The method 650 further includes presenting 665 the insurance risk classification to a plurality of entities, receiving 670 requests from at least one of the entities to provide insurance for or offer services to the driver or fleet of self-driven vehicles, and selecting 675 one of the entities to provide insurance for or offer services to the driver or fleet of self-driven vehicles.

Figure 7:
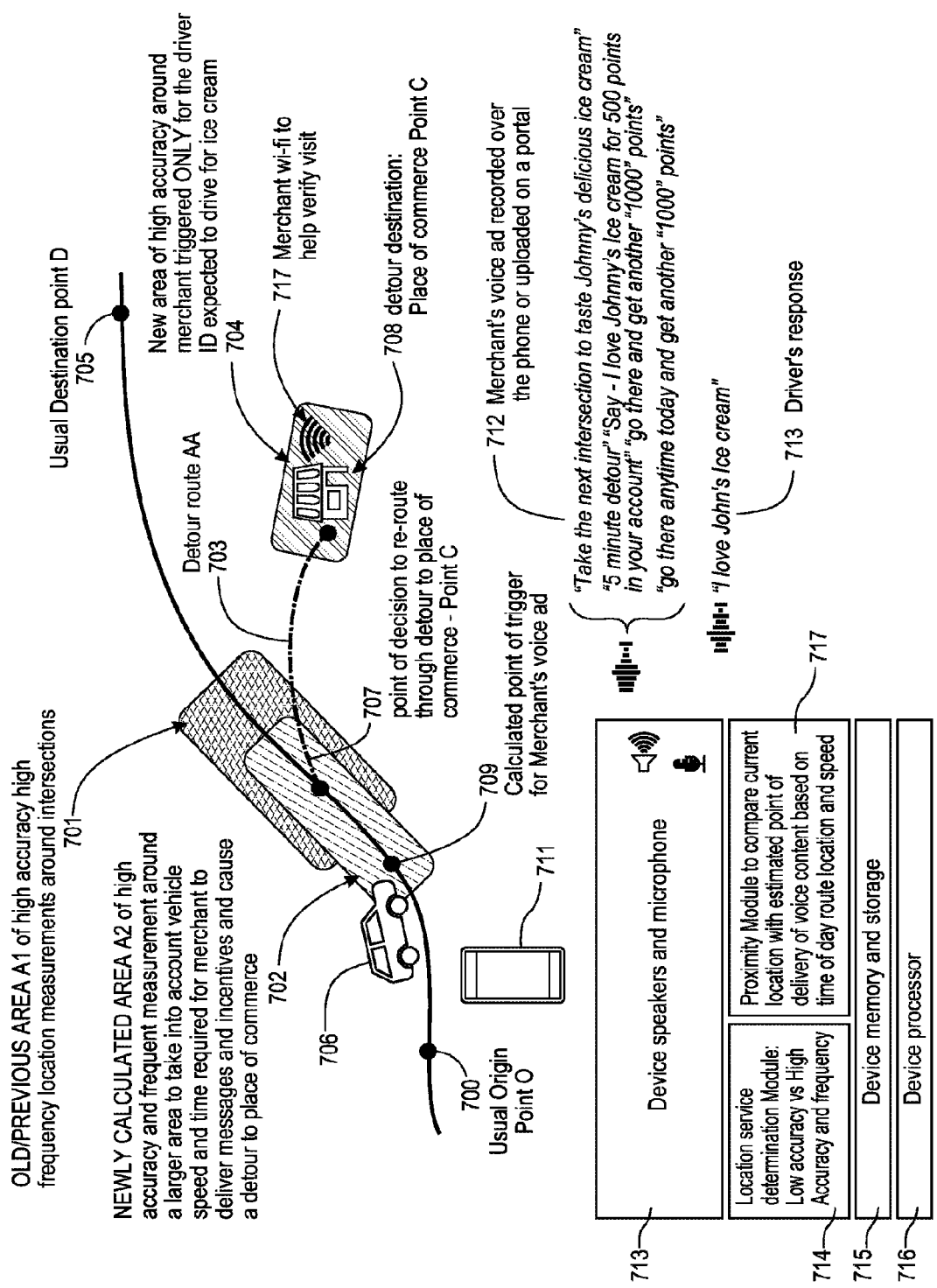
FIG. 7 is a schematic diagram illustrating using known routes driven by a driver to deliver an advertisement to the driver and compensate the driver for responding to the advertisement, according to an example embodiment of the invention.
Figure 8:
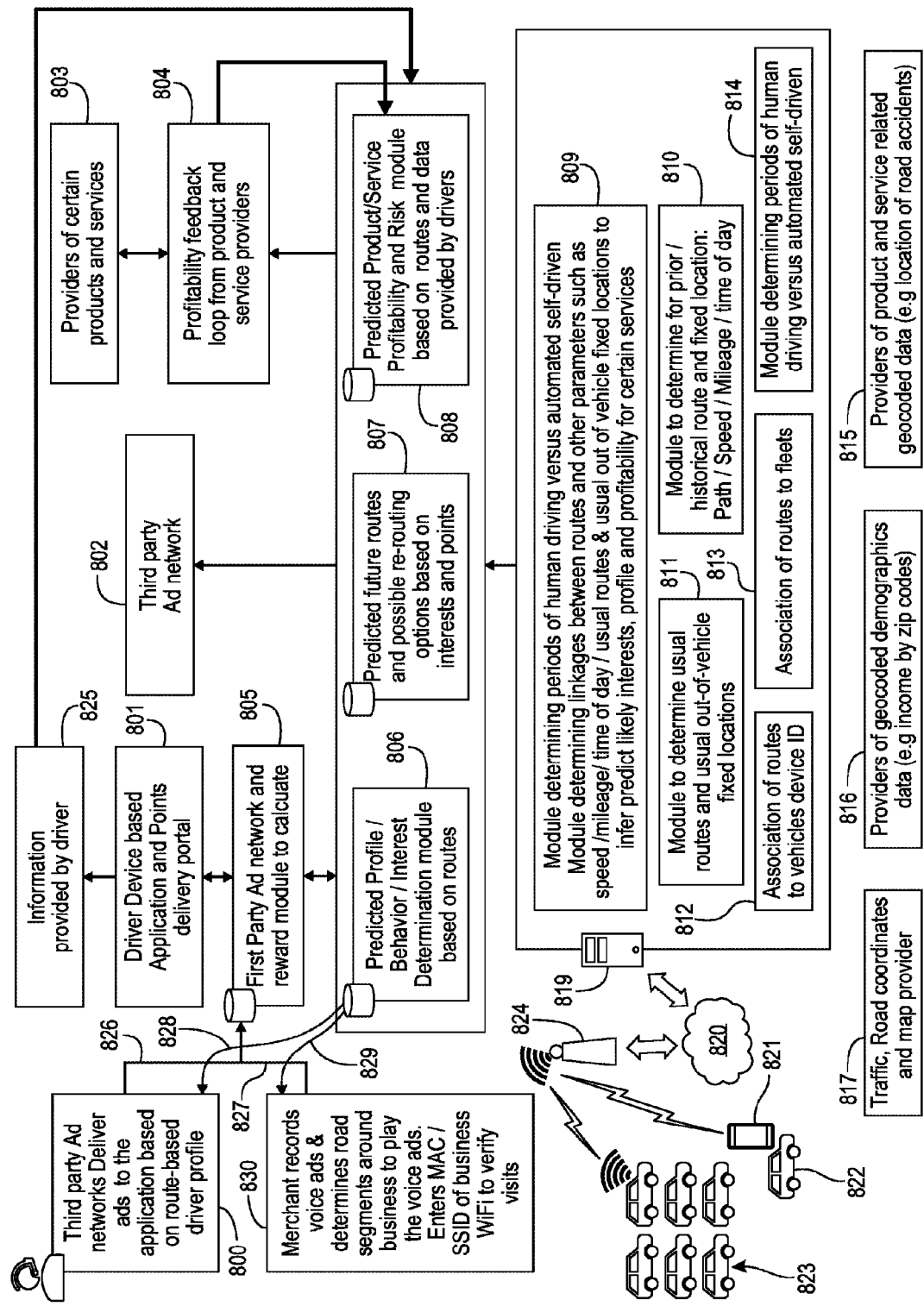
FIG. 8 is a schematic diagram illustrating using known routes driven by a driver to predict profitability of the driver, according to an example embodiment of the invention.

FIGS. 7 and 8 are schematic diagrams illustrating tracking of routes driven by a driver in a vehicle, according to an example embodiment. It can be expected that there will be a level of resistance from consumers to be tracked. Tracking a consumer's driving habits, however, is important to accurately determine routes typically driven and related parameters, such as time on the road, mileage, typical destination points at various time of the day, speed, area driven through, etc., in order to predict the profitability of a driver for various products and services and to keep the driver engaged with the application if some of the product and service providers are requesting access to the most profitable segments for promotional activities.

Prior methods that take into consideration mileage or driving behavior fail because they do not deliver permanent tracking. For example, some discounts on car insurance products have been offered as an incentive for low mileage or good driving behavior during a period of time in which tracking occurs (either through an external GPS device or other methods), but this approach presents very significant issues: once the discount is obtained there is very little incentive to continue to share private information and accept being tracked over longer periods of time, which can be important to properly assess the economics of the underlying risk. Service providers may face fraud on the part of the users as there is very little incentive for the users to keep the external GPS device tuned on during the initial period when they are travelling for long trips during the tracking phase or, alternatively, they end up giving discounts only to the low mileage customers without being able to raise rates for the others, thus making their rating method economically unsustainable. Privacy concerns can be overcome if the consumer receives something in return for relinquishing private information (as demonstrated by social networks). To secure authorization to track the drivers over long periods of time, the disclosed embodiments address ways to overcome resistance of the driver in terms of privacy by providing a benefit to the driver. In one embodiment, points that are convertible to cash, incentives, or merchant coupons are provided to the driver that downloads a specific application and activates it on his mobile device with all or a portion of the advertising revenue going to the driver. So, contrary to the traditional advertising model, where advertising revenue goes to the application developer, the methods and systems disclosed herein can direct this income stream to the user and optimize consumer acceptance of privacy encroachment and provides a more permanent offsetting reward system to the consumer by funneling all or a portion of the advertising revenue back to the consumer.

Another problem with prior methods is that the delivery of advertising on mobile devices in a moving vehicle does not work well. The device is likely to have its screen turned off with the driver concentrated on the road, or the device is showing a turn-by-turn navigation application or playing music. Any ad delivery mechanism must either integrate itself in those applications or be itself audio based with minimal or no data input from the driver (i.e., no possibility of click based advertising or display advertising). Another problem with prior methods is that any advertising that is specifically related to nearby merchants and commerce has very limited value as it is not delivered with the proper timing to impact an actionable result (e.g., re-routing a driver from his usual route while on the road). Furthermore, there are no efficient equivalents to the "click to action" or "converted clicks" in the physical world. Online, one can measure if there is a follow up action after clicking on an ad, such as a purchase of the product or a form filled, and can reward the publisher of the advertisement based on conversions. In the physical world, the follow up action is, for example, a visit to a store. Thus, a clear link between a promotional trigger in the physical world and a physical action (a visit to a store) does not exist. To address these obstacles, an equivalent of a converted click in the physical world can be created to predict the profitability of drivers for products and services. The value of cash incentives or promotional incentives can be optimized by serving targeted ads on the driver's mobile devices or desktop browser that take into consideration the routes being driven, when those routes are driven, the merchants along those routes, and the driver's inferred profile, and by providing all or a portion of the advertising revenue back to the driver. In one embodiment, an interactive voice advertisement is stored in advance (while the device is stationary with a Wi-Fi connection, for example) on the device's local storage based on expected usual routes, and the advertisement is played when the device estimates that the driver is approaching an exit or road intersection that would lead to the merchant, placing the interactive pre-recorded voice advertisement at that moment. The on-device application listens for an audible response of the driver and, through voice recognition, determines if the driver has repeated some key words (such as a brand name or a number) determined by the advertiser/merchant and requested in the advertisement recording. If it is confirmed that the driver has in fact repeated those words through voice recognition software on the device, a certain number of cash convertible points can be deposited into the driver's account. An additional and likely larger number of points can also be deposited as set by the merchant or advertiser connected to the ad network if, within a specific time (e.g., number of days or hours) the driver actually visits the related establishment.

FIG. 7 illustrates an example embodiment that uses prior knowledge of usual routes driven as well as tracking while in a vehicle to deliver cash convertible points to the driver. The embodiment changes the bounds of a high frequency high accuracy region around road intersections to take into account that a voice ad needs to be played much sooner before reaching a key intersection given the speed of the vehicle. The driver 706 is known, through historical analysis of the whereabouts of the driver's mobile device 711, to frequently drive around a specific time of the day from the point of origin O 700 to a destination point D 705. Because the driver has a history of going through the intersection point C 707 around typical times of the day when departing from point O 700, the system can downloaded, while stationary at the driver's residence or place of work, the coordinates of the geo-fenced area A1 701 to limit the increase of frequency and accuracy of location measurement to this specific area of the road segment according to the methods disclosed herein, and reduce battery and bandwidth consumption. If an advertisement is to be delivered, the centralized server 819 can change the area A1 into a new computed area A2 if an advertisement is to be delivered before Point C 707. This is because an advertisement message needs to reach the driver much sooner, and the high accuracy location needs to be triggered much sooner when advertisements that encourage the driver to take a detour at point C 707 to reach, through a detour route AA 703, a place of commerce located at point D2 706. The shape of area A2 can be calculated by the server 819 and rely on prior historical speed of the particular driver on road O-D around that segment. The speed is important in determining how much sooner before arriving at junction point C 707 the driver would need to receive information about the detour. Information is in one embodiment delivered through interactive audio ads and can contain, for example, time it would take to go through the detour, number of cash convertible points received if the driver takes the detour, and which merchant is advertising, as well as a short more tailored message 712 from the merchant. Once the shape of area A2 is determined based on prior speed and routes, it can be downloaded in advance in the device memory 715 along with the audio message recorded by the merchant 830 while using a first party ad network 805 to target specific drivers that typically drive through specific intersection points, such as point C 707, that can be convinced of a minimal detour time to the merchant's place of business D2 706.

The device memory and storage 715 can be used to optimize bandwidth utilization and battery usage. An interactive merchant advertisement 712, the coordinates of nearby road segments, and the computed coordinates of the new area A2 can be stored in advance (while on Wi-Fi at home or work, for example) in the device memory and storage 715. The device processor 716 causes the proximity module to compare actual location measured by the location service 714 to those road coordinates and area A2 coordinates to detect proximity to areas of high accuracy at intersections, ad trigger zones (such as A2 and the actual route), mileage, and speed of the vehicle. The local application stored in the memory of the mobile device executes commands that play the interactive audio as it approaches the point where a detour may be needed. Using voice recognition technologies embedded in the device, the application recognizes if the user responds to the audio ad on the device speakers 713 with predetermined interactive responses (such as, for example, Yes/No/"I Love Walgreens"). The answers are captured by the microphone 713 and analyzed through the device voice recognition, and the volume of the response is captured by the application (e.g., as a measurement of enthusiasm) and entered as a parameter in a behavior profile module 809.

The interactive merchant advertisement 712 can take the form of files that take much storage and time to download. Because area A2 is also stored on the device, it enables the storage of the voice files to be stored as well. Large files are required if the merchant chooses to have a long interaction with the driver. The advent of artificial intelligence enables maintaining long conversations. In one embodiment, the merchant can use the interactive voice ad to fill in forms, giving out cash convertible points for each answer. So instead of being a one question 712 and one voice answer 713 from the driver, the interactive ad could be a questionnaire with multiple questions and multiple answers and, thus, the voice files could increase in size very quickly, requiring Wi-Fi/local hotspot side download to save bandwidth on costly wireless networks.

Short interactive ads are as illustrated: advising of a detour, detour length, points if ad is acknowledged (with voice recognition), and points expected if the driver visits the merchant's place of business. A longer interactive ad could involve, for example, trivia games about the brand or an acknowledgement of key attributes of the product ("do you like music," "do you like sounds that can shake walls," "next exit turn left to go to Johny's Ultimate Loud Speakers"). Other long interactive questionnaires could also be sent from time-to-time by the system (as opposed to by the merchants) to capture driver provided information 825 shown in FIG. 8 that can contribute to the accuracy of the profitability predictions for various products and services. For example, for auto insurance profitability predictions, some of the information that augments the route data could be captured in the same way through interactive voice questionnaires using the same methods disclosed here. Complementary information that can be captured from a driver (for example, car VIN number, driver's license number, gender, birthday, make/model/year of car, current mileage on car, name, address, email address, current insurance carrier, current rates, social security number, various authorizations such as for insurance products), allowing the intermediary using the system to become the agent of record on the current insurance policy and to switch insurance carriers if need be, assuming similar rates and coverage.

The reward module 805 determines the portion of the points that accrue to the driver. This can be based on the amount of data that has been provided by the system-generated questionnaires 825. In one embodiment, if all system-generated questionnaires are answered, 100% of any ad revenue may accrue to the driver. In one embodiment, the reward module 805, determines if the driver has visited the merchant establishment within a predetermined number of days based on measurements of the device's location services module 714 and the proximity module 717 or if the captured SSID addresses of the nearby Wi-Fi hotspots matches the merchant SSID. A typical implementation of this requirement can require the merchant to surround his place of business with a geofenced area 704 on the console of the First Party Ad Network 830. The geofenced coordinates can be sent to the device's memory and storage 715 and compared using the Proximity Module 717 to determine if the driver has visited the merchant's location and stayed there for a specified amount of time. This approach is battery and bandwidth intensive.

To detect presence at the merchant establishment, in one embodiment, unless a user turns Wi-Fi off on his mobile device before he leaves his house, the device automatically scans for available Wi-Fi networks nearby. Smartphones and other devices typically use both passive and active discovery—they passively listen for Wi-Fi access points broadcasting to let nearby devices know they are available, and they actively broadcast requests searching for nearby access points. Due to the way Wi-Fi is designed, a device searching for Wi-Fi access points includes its MAC address as part of the "probe requests" it broadcasts to nearby Wi-Fi access points. This is part of the Wi-Fi specification. To verify that a user is in a store, one can verify his/her MAC address as well. Some mobile device brands mask/randomize the MAC address.

In another example embodiment, to detect the presence of the driver at the merchant's establishment, bandwidth and battery usage are reduced by having the merchant enter the Wi-Fi SSID of the hotspot in his establishment with the advertisement(s) downloaded. For example, the application can sense whether the device is within range of a merchant Wi-Fi hotspot. The merchant/advertiser can be linked to the device through the application running on the device, and the merchant can store its own merchant SSID Wi-Fi on the driver's device while downloading an advertisement. If a visit occurs as a result of the advertisement, the mobile device application can detect the merchant SSID at the merchant's establishment and recognize that a visit occurred. Once the visit is detected, the application can trigger a deposit of cash-refundable points in the driver's account with the number of points/amounts deposited determined by the merchant when he places the advertisement. The number of points credited to the driver can depend on amount of time spent at the merchant's establishment and/or frequency of the visits. In one embodiment, the Wi-Fi access point may cover only the cash register location. Using the merchant Wi-Fi information, the location service module 714 does not have to make precise location determinations against a geofenced area 704. Instead, as the device enters area 704 calculated by the central server, it can start verifying from the SSID broadcast which ones correspond to the SSIDs entered in the console 830 to verify the visit of the driver to the merchant location, thus completing the delivery of cash convertible points to the driver through the reward module 805. If the visit happens within the period advertised, a number of points can be deposited into the driver account. This method of correlating visits to drivers is very compelling for advertisers as it allows them to provide discounts (or in this example, cash back) to a very select segment of the population without having to train their staff and without giving equivalent margin eroding discounts to all walk-in customers, thus reserving price integrity of their merchandise. The target can be those individuals who pass by their place of business frequently and are within a predetermined number of detour minutes, for example, of their locations at specific periods of time. For example, a merchant may prefer to catch drivers on their way back from work rather than in the morning for certain establishments, or on their way to their typical grocery store. Thus, the disclosed embodiments create a form of real-world "click to action," which is when an advertiser pays a publisher not only to displaying an ad, and not only for a click on the ad, but also in the case something is actually purchased while on the advertiser web site. In the physical world it is extremely difficult to create a "click to action" equivalent; however, the disclosed methods and systems allows merchants to detect the presence in their place of business of the precise visitor they sent an ad x days or x hours ago. Because the cause is so direct and measurable, merchants will be likely to pay for such success based advertising a much higher amount than traditional ads, especially because the money goes directly to consumers and is viewed as a product discount for the consumer rather than an advertising cost for the merchant. The money is paid to the driver and not to an application developer or content provider and, as such, can be a key incentive for the driver to leave his location services on at all times and allow the on-device route determination application to request location information at any moment.

The targeting ability of promotional messages based on prior routes requires knowledge of historical routes, and the ability to redefine the areas of high frequency high accuracy location measurements. It requires that ad networks have access to route information databases 807 and profile databases 806 to deliver promotional messages to participating drivers, and to detect if a specific driver takes a detour to a merchant establishment. The tailoring of the first party ad network 805 is unique because it targets drivers based on prior routes and expected future routes, not on current location, and reshapes area A1 to area A2 based on speed from prior routes and other road factors, such as speed limits on those road segments. Ad networks offer location based advertising, based on coarse prior location knowledge (city, zip code, and real time current location), but the disclosed methods and systems provide route segments frequently driven as a segmentation approach to advertiser's campaign managers and a system that can effectively re-route at specific intersection points that are used as triggers for advertising in a way that reduces significantly data and battery usage through the reshaping of location intensive zone in anticipation of a detour decision. Furthermore, the ability to link the merchant SSID to the advertisement and the driver enables a low resource method to detect visits in the physical world as a direct result of placed advertisements.

Figure 9:
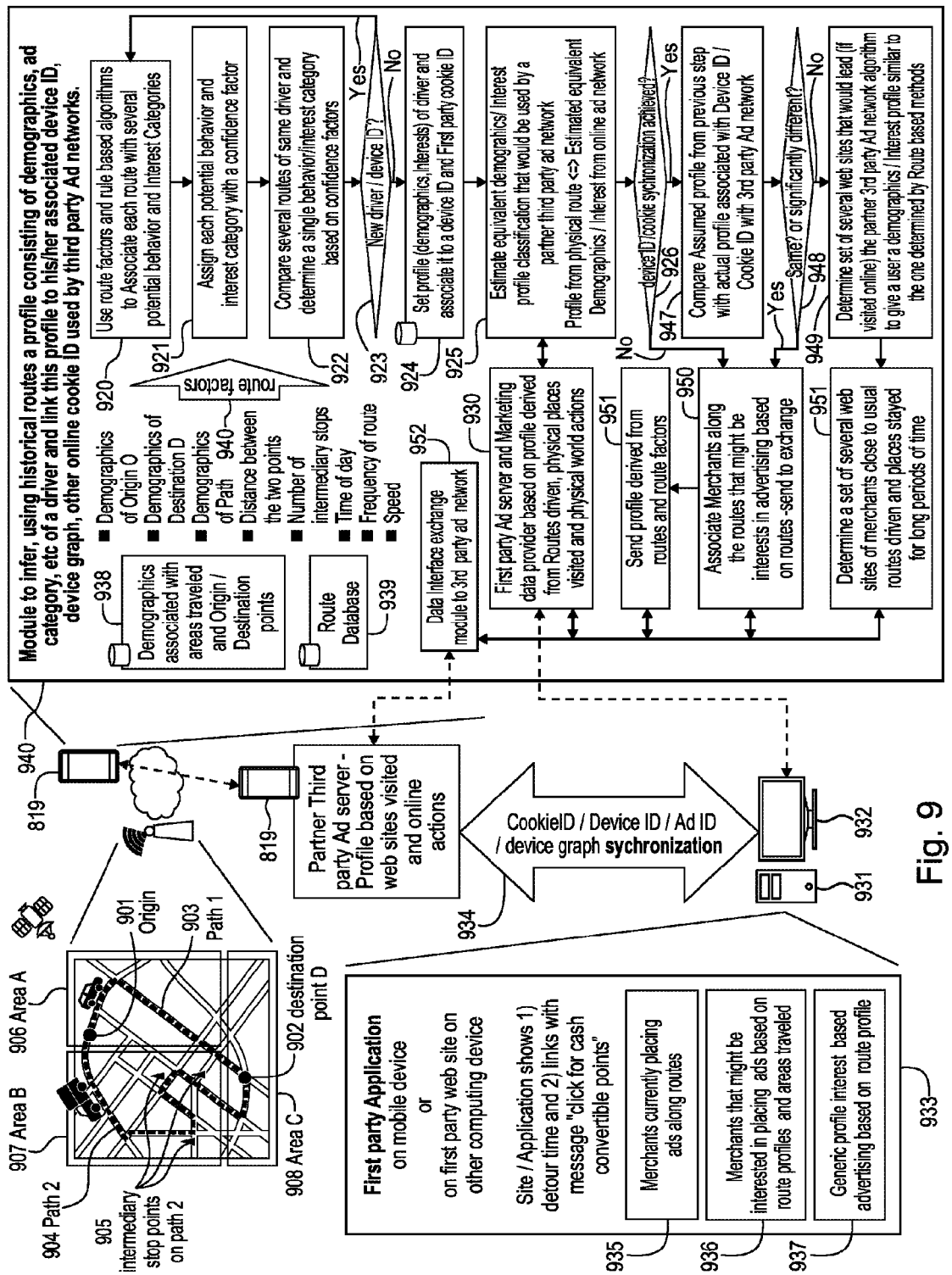
FIG. 9 is a schematic diagram illustrating creating profiles of drivers based on collected driving information.

FIG. 9 is a schematic diagram illustrating real world cookie-like functionality. Online, advertisers typically use cookies to collect anonymous information about a website's visitors. The advertisers then use this information to create profiles containing specific details about a user and to display relevant ads based on the sites visited by that user and the user's activities on those sites. The profiles are classified according to certain categories of users, such as users likely interested in mortgages or users likely interested in travel, etc., or, more simply, what the visitor searched for on an online site, such as "smartphones unlimited data." Typically, websites store cookies by automatically storing a text file containing encrypted data on a user's machine or browser the moment he or she lands on a page online. Whether it is a permanent or a temporary cookie, the idea is to create a "log" of the user to facilitate future visits to the site. When these cookies are collected to create a certain idea about a user, that is called cookie profiling, or web profiling. Collated data may include browsing habits, demographic data, and statistical information, which are what marketers are after in order to mark a user. Cookie profiling is performed by advertisers networks, but the cookies they need to create these profiles are obtained from several online sources, mostly from administrators of popular sites receiving millions of traffic monthly, and third party cookies are used by ad networks to identify consumers across different mobile web sites. When a consumer visits a web site, the pages they visit, the amount of time they view each page, the links they click on, the searches they make, and the things that they interact with, allow sites to collect that data, and other factors, to create a "profile" that links to that visitor's web browser. As a result, website publishers can use this data to create defined audience segments based on visitors that have similar profiles.

An example embodiment of the disclosed methods and systems creates similar, cookie-like functionality for advertisers to provide information and profiles based on actual physical places visited and actual routes driven instead of websites visited and browsing activity. The methods and systems disclosed herein can create a demographic profile and targeting categories that are linked to routes driven and places visited, but integrate seamlessly with what existing ad networks have already built for the online world.

FIG. 9 shows methods and systems to determine a driver profile in terms of demographics, interests, and behavior as inferred from the driver's usual routes driven. FIG. 9 shows the apparatus and the steps taken by a computer program giving instructions to the CPU of the central system server 819. Storage 938 contains data structured in a database accessible by the CPU of centralized system server 819. The database 938 contains demographics data for geocoded areas, such as types of establishments in an area (high end retail stores, typical suburban service and restaurant chains, offices, manufacturing, etc.), average age, income, ethnicity, residential versus commercial zoning percentage, single home versus apartment percentage, and average house prices for specific geocoded areas.

Each route taken follows a path that may cross several areas with different demographics. For example, path 1 903 crosses area A 906 and area C 908, whereas path 2 904 crosses area B 907 and area C 908. The path of each route and the area types travelled are stored in the route database 939 and compared to the demographics database 938 as well as all the parameters, attributes, and factors of the route 940. Route factors in one embodiment are: demographics of point of origin O 901, demographics of destination point D 902, demographics of areas crossed by the path driven between O and D, distance driven between those two points, number, type, and location of intermediary stops 905, time of day, frequency of route between O and D, speed on road segments between O and D, and average route speed, are provided to module 940 for processing and inference of a profile.

At step 920, each specific route is associated with several demographics and interest categories based on the route factors with each assigned demographics/interest category having a calculated confidence factor as set by an algorithm and its underlying business rules and assumptions. An example of assigning demographics and interests based on route is illustrated in FIG. 9, which provides an example of two routes taken by the same mobile device/driver from the same point of origin 901 and to the same destination point 902. Point O of origin 901 is located in Area 1 906, which is, according to database 938, located in very high income residential area, and destination point D 902 for the purpose of this example is located, according to the database 938, in area C 908 downtown in financial districts with a high concentration of office buildings and high end bars. A driver from Point O to Point D can, therefore, be assumed to be a high income professional commuting to work with a relatively high confidence factor. However, if the same mobile device/driver is seen also to drive along path 2 to go from point O to destination point D, the profile attributed to the driver could be completely different because path 2 goes through area B, which is, according to database 938, highly industrialized, with a high concentration of storage areas and manufactures, and there are a large number of stop points in between. Furthermore the path 2 mileage is much higher than path 1, which is the shortest route between O-D. The module at step 921, given those route factors 940 can then attribute a high confidence factor to a different profile to the driver: a working class individual picking up and delivering merchandise along a known route and a much lower confidence factor to a profile of a high income professional commuting to work despite the route's similar demographics at the point of origin. Step 922 makes the final decision as to which profile to attribute to the driver given a multitude of routes by the same driver and a comparison of the confidence factors for each route. If, for example, path 1 903 was an exception and the vast majority of the routes were on Path 2, the profile attribute to path 2 is determined to be the final profile of the driver (unless of course being contradicted by future routes over time, at which point the profile changes to accommodate the new confidence factors weighted with the frequency of the new routes). Similarly, the time of day can also be used to determine various confidence factors: if arrival time at destination point D using path 2 is late mornings, it is unlikely that the driver is an office worker, even if he may be going through path 1 903 very often but late at night, as this may indicate a young delivery worker going from time to time to the bars downtown using the shortest route. Once the final profile is determined, it is stored in the profile database 924 where it is used in step 925 for further use by first party and third party ad servers and ad exchange platforms.

The profiles created by the disclosed methods and systems are "native" to the physical world. They are based on an analysis of routes and paths taken by the driver and are defined through movements, mileage, time of day, and impact the classification for profitability of products or services. In one example embodiment, native route-based categories of profiles can be called "high mileage," "outdoorsy," "commute time mostly on highways," "weekend trip fan," "goes weekly to low income strip malls"). Route-based native profiles are different from profiles that can be obtained from the knowledge of online browsing activity. If, however, the profiles are merged or synchronized with online browsing information, route-based native profiles can be both confirmed and also nuanced, and the classification of the driver can be made more accurate (e.g., in the example above, even though the person above could appear as a young working person with modest income, an online view of web browsing activity may indicate heavy studying in the medical field, thus making that individual's long term earning potential very high.)

Typically, online information can allow advertisers to target consumers based on demographic characteristics captured and supplied by third party ad networks, such as, for example, education or age, behavior (based on actions related to interest, keywords, purchase intent, and life stage), location, mobile device business category, and context (what is going on around the consumer at the moment when the ad is being served), purchase history, interests, and lifestyle. Advertisers can narrow the focus of their ads to reach, for example, only moms, luxury car drivers, Latinos, or business travelers at specific locations or times of the day. There are several issues, however, when the user uses several browsers, account IDs, and several computers and devices to access information. It becomes very difficult to derive a unified vision of the browsing habits of the user. Methods exist to develop a device graph to link all devices to the same individual. Methods also exist (using probabilistic approaches to link IP addresses to the same user) in order to address cross-browser usage, however those methods are not precise and are delayed. The methods and systems disclosed herein reduce delays and inaccuracies and augment a user's profile across several browsers with route-based native profiles. There is a significant benefit in integrating the profile derived from the physical world (usual driving routes, miles travelled, home and work locations) with the online advertising platforms, profiles, and cookies through synchronization as disclosed herein. Augmenting the profile of online third party advertising networks 819 allows for a better understanding of the demographics and interests of an individual.

In addition with real-time integration of the online/physical world profile, better results are achieved. A real-time integration allows a re-categorization of the profile that is more precise and faster than what an ad network would provide alone. As an example of the real-time benefits of the remapping capability, one could confirm in many cases the immediacy of certain life events more accurately and faster using route information when used in combination with web browsing information. For example, a sudden onset of web browsing for a house or a car is typically indicative that a major purchase may happen soon, however it is only when routes around residential areas during the weekend with multiple stops are detected or when multiple routes to car dealership are detected that there is a confirmation that the purchase is likely immediate and, as a result, certain products and services, such as home insurance or car insurance can be marketed with increased intensity.

Cookie syncing works when two different advertising systems (platforms) map each other's unique IDs that they have both gathered about the same user. Steps 925 et. seq. prepare the data in database 924 to be integrated with a partner third party advertising network. A prior partnership should be established so that data can be exchanged along predefined interfaces back and forth through the data interfaces exchange module 952. Step 925 maps route-based, "native" profiles in the physical world to online profiles typically used by online ad servers by stripping the route base information and relying instead on the derived demographics/interests set at step 922. For each driver, the profile from physical route is, therefore, associated with an estimated equivalent demographics/interest classification used by the partner third party online ad network.

Often, the partner third party ad network 819 may have a device graph from prior analytics and, therefore, may have a device ID associated with its profile or cookie ID. In addition, through the first party application 933, which in one embodiment is a website where drivers can convert their points into cash and residing either on the mobile device of the driver 931 or on a computing device running such application 932, a cookie synchronization process 934 can synchronize the identities of the driver with cookie ID's information already collected by the third party ad network 819. Example steps taken by the synchronization module can be as follows:

Driver visits first party application site 933 that contains an ad.

The browser sends an ad request to a third party ad network 819.

The ad network sends back the request and creates a (third-party) cookie.

The ad network 819 redirects (http redirect) the ad request to the pixel URL on the marketing data provider side 930, passing the user ID in the URL parameter. The marketing data provider 930 reads its own first party cookie, or creates a new cookie, and saves the user ID passed from the ad network along with its own user ID in a "cookie-matching table."

To make the sync bidirectional, the marketing data provider redirects back to the ad network, passing its own ID in the URL parameter. The ad network receives this request, reads its own cookie, and stores the marketing data provider ID along with its own ID in the cookie-matching table.

Now, both the ad network and marketing data provider have each other's user IDs in each other's databases.

There are different types of identifying devices ID in android devices for example: Unique number (IMEI, MEID, ESN, IMSI), MAC Address, Serial Number, ANDROID ID, and ad ID, etc. that can be synched in various embodiments using both probabilistic methods with IP addresses or login information across major web sites.

At step 926, with the partner 3rd party ad network and the inference module 940 both having synched the device ID and cookie IDs the system proceeds to augment and synchronize each other's understanding of the interests, demographics, and profiles of the same driver/web-user.

Step 947 compares the profile from step 925 derived independently from the routes with the profile associated with the device/ID/cookie ID at the third party ad network and derived from web browsing activity. The real-time matching module 947 that maps the targeting categories derived from routes to the targeting categories traditionally used by the partner ad network 819 is achieved using the confidence factors calculated during steps 920 and 921 and a set of business rules provided by the partner ad network. As the confidence factors change so does the profile, making the matching process a real-time process that matches in real-time any changes in route behavior in the physical world that might have gone un-noticed online. If the profile characteristics are the same within a threshold confidence factor, then the inference module uses the data exchange module 952 to send to the third party ad network the route-based profiling parameters through steps 951, which are now considered consistent with the driver's online persona, interest, and demographics. As an illustrative example, one category could be "travels mostly in the afternoon, weekdays" or "sales representative, travels above average mileage between cities." Since those are not categories/classifications typical of an online ad network (which use more interest-based rather than route-based categories), the ad network would add those new items as new targeting capabilities for its advertisers.

In addition, to augment the information at the third party ad network with route-based data captured through an embodiment of the disclose methods and systems, the list of merchants or franchises within a reasonable driving distance from the usual routes, from home or usual place of work is sent at step 950 as potential advertisers of interest for that driver. This exchange of information to augment the knowledge of third party advertising networks with route-based information bridges the online behavior, with the behavior in the physical world. This complementary additional profiling data is sent over the link 945 to the partner ad network from the marketing data provider 930 and can include, for example, the device ID/Advertising ID of the device used by the driver (which is most likely associated with the ad network cookie ID) and the associated mapped profile in order to expand the reach and segmentation capabilities of its ad network.

An additional technique can deepen the knowledge of the driver at the partner ad network level and may be used at step 948 if it is determined that the online and physical profiles are significantly different. In one embodiment, the inference module 948, attempts to inject some of the characteristic of the driver's route-based profile into his or her online profile as determined by third party ad networks. The purpose of injecting new characteristics is to slowly correct or influence the online profile based on what is observed in the physical world. For example, an online profile could show a older person constantly shopping for medical devices or medication, whereas the physical route-based profile could be the profile of a very young person going out often late at night. The demographics of the two profiles are not consistent and could be caused by insufficient data collections either online or in the physical world. If sufficient physical data has already been obtained on a large number of routes confirming the profile with a high degree of confidence, the physical profile can influence the online profile, and at step 949, a reverse algorithm can be used to determine, through a series of steps disclosed below, the set of websites that would need to be visited online that would result in the third party ad network to attribute a profile closer to the one in the physical world. Step 949 would then send those websites to the partner third party ad network so that they can assume those websites as being visited as part of the online web browsing experience in order to shift its perception of the online profile closer to the one determined in the physical world. This method allows the ad network to consider those sites in the future as the profile of the user is changed over time through new browsing activity. The resulting cookie (a cookie with its attributes set by both online and physical/route-based information) is more optimized for future advertising placement. Step 951 ads to this list of websites, the websites of the merchants within x minutes detour from routes and merchants around the areas they spend the most time during certain periods of the day and/or certain periods of the week. For example, frequent visits to a physical Best Buy establishment can trigger inclusion of bestbuy.com and/or several other electronics stores. As a further example, a home location determined through route-based profiling in a high income neighborhood can trigger the inclusion of high end restaurant chains in the online profile even though past browsing activities may not have detected this interest.

An example embodiment of the disclosed methods and systems can determine the profitability of a driver, a group of drivers, or a fleet of self-driven vehicles for various products and services based on routes driven, rather than traditional parameters. As an example, auto and vehicle insurance companies covering property damage and liability from accidents typically use various indirect underwriting factors in order to determine a driver risk and set corresponding premiums. The classification of risks determines the premiums paid to the insurance company or the amount of expenses, such as commission expenses, that can be paid for the same premium. If a risk is in a lower risk class, then the insurance company can profitably pay higher commissions or pay higher promotional or advertising expenses to acquire that business.

Unfortunately, indirect underwriting factors are typically given more importance than direct factors in evaluating risk.

Current actuarial analysis is based on secondary or indirect underwriting factors, such as type of cars owned, age, zip code, past traffic violations, credit score, etc. Although these indirect parameters are important as factors influencing risk (and corresponding actuarial and statistical analysis with a vast amount of historical data points have resulted in positive profits to the satisfaction of insurance companies), the primary or direct factors, such as mileage and speed, which are very difficult to capture are often ignored in the upfront evaluation of the risk and are, therefore, ignored in the upfront evaluation of the rates and the commissions paid to insurance agent/brokers. Because they have a much more direct influence on the insurance risk, they could be a much better predictor of the economics of the insurance cost, especially when combined with route based interests and demographics.

In some instances, this kind of analysis has been attempted using short term vehicle tracking using devices such as the Progressive's Snapshot device that plugs into a car's OBD port. The problem with most of these kinds of devices is that first they are for temporary use as users typically do not like being permanently tracked for privacy reasons, and secondly, they are used to get a short snapshot in time of the car and does not provide a long term view of the driving habits of a specific driver. Drivers can be on their best behavior while using those devices, and cars can usually be driven by various family members and, therefore, there could be situations where using a device linked to a vehicle rather than a person does not provide adequate information to underwrite the individual. Another major issue with these types of devices is that the information captured is proprietary to a specific insurance carrier and, therefore, cannot be used if the driver wishes to switch insurance companies.

Another issue is that with the advent of self-driven cars, the vast amount of historical data points do not exist. Self-driven vehicles are expected to be safer, but if they are constantly over-ridden by impatient drivers, their safety benefits will not be apparent. Another complicating factor is that all self-driven cars are not created equal, and some will have a better track record than others on the road in terms of accident and profitability for insurance services. The traditional parameters (driver age, prior infractions, residence zip code, car color, etc.) could quickly become irrelevant for assessing the profitability of this type of risk, especially as more and more hybrid cars (cars that can be both self-driven or manually driven) are put in the market.

To address those obstacles, an example embodiment classifies profitability/risk for certain products and services using first partial route information and then dynamically updating the risk classification as more route information is added to the driver profile or more driver-supplied personal traditional information is shared. This method assumes that the determining risk factor (and therefore profitability factor) is the routes driven and the speed at which those routes are driven, rather than the traditional information captured through standard underwriting or standard segmentation. For example, a risk can be classified, first, using only driving information without necessarily knowing the age of the driver for example or his address of residence. This approach can be applied in other industries, such as the profitability for medical or wireless services being determined based on the number of routes terminating at medical facilities or pharmacies, as opposed to age or other traditional factors, and the methods and systems can reclassify the risk once additional information is obtained dynamically.

Another embodiment can determine the percentage of time a hybrid car is self-driven. Self-driven vehicle software will likely always have the capability to determine when the car is in self-driven mode or when there is an override of its automated functions. It is however highly unlikely that this information will be shared with insurance carriers in a way that will assist in risk assessments. In one embodiment, this determination is achieved independently by a third party system connected by an exchange or clearinghouse with various fleets by comparing various routes of self-driven vehicles with routes and paths from mobile devices, such as mobile phones carried by drivers. If the routes taken by the vehicle, as measured by in-vehicle GPS or other location services, are sent to a centralized CPU through an exchange, then the matching of a vehicle ID with a device/driver ID can occur if the routes and paths of the device and the car match, and are the same within a threshold confidence probability. In that case, the last known location of the car should also match the last known location of the device ID, or else it can be determined that the vehicle is a shared drive, such as, for example, Uber. Furthermore, if the car is overridden temporarily by a human driver, then matching can continue; however, the mileage driven by the human driver can be deducted from the overall mileage for the fleet being driven by the same software and hardware configuration for the purpose of calculating the risk adjusted effective mileage of the automated driving unit.

The disclosed systems can place the tracking data in the hands of third-party intermediaries, rather than in the hands of the providers of products and services. An example system can include an industry wide exchange module that gives product and service providers access to a profit segmented base of drivers or fleets for promotional purposes, or for bidding purposes to incentivize the third-party intermediary to convert or switch a certain profitable portfolio of drivers or book of business to their brand, and their products.

Figure 10:
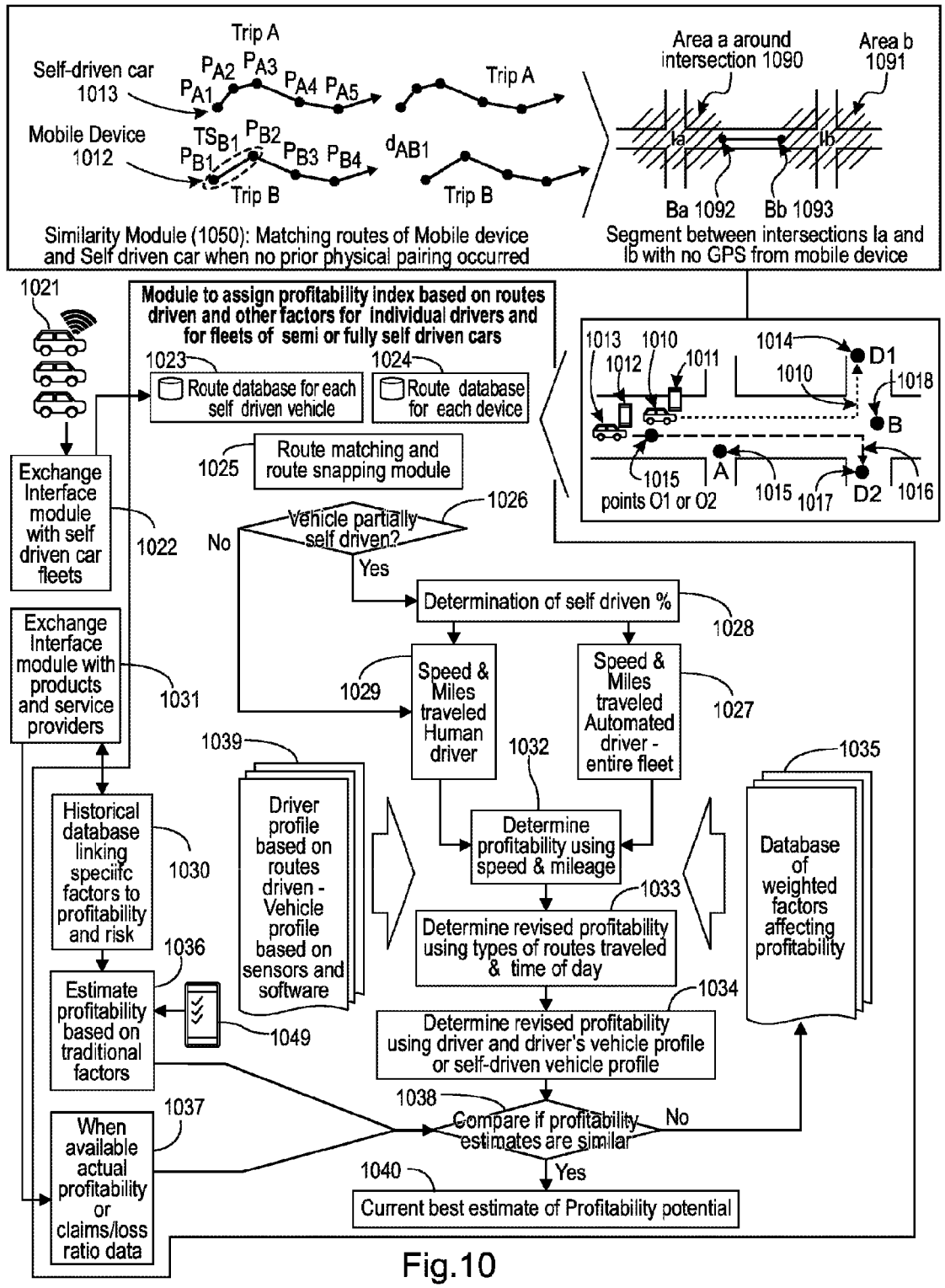
FIG. 10 is a schematic diagram illustrating assigning a profitability index to a group of drivers or self-driven vehicles.

FIG. 10 illustrates a representation of an environment in which traditional vehicles (manually driven 100% of the time) co-exist on the road with vehicles that are driven manually by humans only some of the time and with vehicles that are fully automated and self-driven all of the time (except for emergency override). FIG. 10 also illustrates methods and systems to assign a profitability index or risk pool for certain products and services to a group of drivers or self-driven vehicles. FIG. 10 also discloses an example attribution of vehicles' movements to specific mobile devices, especially in the case of self-driven vehicles.

FIG. 10 includes a flowchart representing an algorithm that may be executed by software code residing on the centralized system server. It discloses how each driver or each fleet of self-driving vehicles can be assigned to a pool or segment based on their estimated profitability for various products and services. In general, the profitability of several products and services can be linked primarily to routes driven (e.g., how many miles are driven, where, when, and at what speed). Other factors, such as how the vehicle is driven (e.g., sudden acceleration, deceleration, or changes of lanes) can also have an effect. The list of such products and services can be quite long when the routes are used to determine a driver profile, and the profile can be determined based on routes driven to infer interests, age, and other demographics. For example a low-mileage vehicle during weekdays can indicate a retired person, but a profile based on routes to entertainment places and airports, as opposed to hospitals and pharmacies, may indicate a highly-active retiree, and travel packages could be marketed as opposed to medical products. Vehicle insurance to cover property and liability losses is another example of a product or service whose profitability often depends primarily on routes driven factors. Often, profitability without route information is inferred indirectly using available information. In the case of vehicle insurance, traditional factors include, age, vehicle type, residence zip code, credit score, and past infractions, but direct factors, such as how many miles are driven, where, when, and at what speed are not considered as this information is not typically available. Similarly, for fleets of self-driven cars, the manufacturer of the vehicle software and sensors could be taken into consideration, but the primary determinant of how many miles are driven without an accident and on what type of roads (the self-driven software "road experience" and reliability index) could be an important aspect to consider. As an example for vehicle insurance, two fleets with similar mileage without accident should not be treated equally if one fleet is driven primarily on highways and the other primarily in urban settings where collision avoidance is more challenging and is a better indication of future profitability.

Embodiments of the disclosed methods and systems may assume that there is a mix of vehicles being tracked: vehicles driven 100% by a human driver, vehicles driven from time-to-time by human drivers, and self-driven vehicles driven using on-board software and sensors (except in case of emergency manual override). For certain products and services, it can be important to distinguish if a mobile device being tracked on roads is linked to an active driver or a passive passenger in a self-driven vehicle. As an example for vehicle insurance, it is difficult to evaluate profit potential of a driver that manually drives his vehicle only 30% of the time by a human driver and the rest of the time uses the vehicle in self-driving mode. The driver may not be liable for accidents occurring in self-driven mode, and the mileage in self-driven mode is not an indication of the insurance risk of the driver. In fact it should have an opposite effect since a significant number of miles using a self-driven mode from a manufacturer with a track record of no accidents should actually reduce the risk associated with the driver (regardless of his age, residence zip code, credit score, and other factors used traditionally by insurance carriers to determine risk). FIG. 10 shows how the example system differentiates when a route segment is driven manually or in a self-driven mode. The fleets of self-driving capable vehicles from the same manufacturer 1021 may keep in their logs the geographic coordinates of the vehicle and the time periods during which the vehicle operated automatically, which can be sent from time-to-time to the manufacturer. These logs can be sent through an exchange interface 1022 to the system's centralized server, which stores the data in a database 1023 accessible by a module that assigns profitability to drivers.

The self-driven cars capture a large amount of data that can be made available through the exchange interface 1022. Included in that data set may be the GPS coordinates of the routes taken by the vehicle and the route segments during which the vehicle is in self-driving mode. This data can be stored in database 1023. Similarly the GPS measurements for the routes taken by mobile devices of participating users can be stored in database 1024. It is important to understand when self-driven route segments occur, since liability in case of an accident can shift from the driver to the manufacturer of the self-driven vehicle and its software vendors controlling similar fleets of vehicles from different car manufacturers. In addition, the mileage during those route segments should not accrue to the driver for the purpose of profitability assessments, but rather to the software vendors for vehicles equipped with similar self-driven software.

In one embodiment, the user of a mobile device 1012 pairs his device with the self-driving capable vehicle 1013 using Bluetooth, Wi-Fi, physical cable, RFID, or any other short-range wireless signal. In the example case, the information sent through the exchange 1022, which is connected to various self-driven systems and stored in database 1023, already contains this pairing with a specific driver ID and it is relatively simple to remove from the database 1024 the road segments during which the car was self-driven. In another example case, the pairing does not occur (for example, the user of mobile device 1012 does not have his Bluetooth/RFID/Wi-Fi on or is a passenger in a self-driven car belonging to a fleet of vehicles such as Uber. In this case, it is difficult to match the route segments in the database 1024, which tracks the mobile device for a specific driver with the route segments during which the user is not manually driving the car. The route matching module can extract that information, however, by comparing the two sets of data. Since there is no pairing of a vehicle with self-driving capabilities with a driver ID, the number of route segments to compare and match between the two databases can be very large. The methods described herein reduce the computation-intensive matching process to something that is manageable and low cost in terms of CPU processing power required to perform such a complex task.

In order to determine whether a person with a mobile device is manually driving a vehicle, a path A from the GPS coordinates captured by the vehicle's self-driven software can be matched with a path B from the GPS coordinates of the mobile device 1012. If they are determined with enough confidence to be along the same path from the same origin point O1 1015 to the same destination point D2 1017 the mobile device 1012 may be paired with the vehicle 1013. To do this programmatically, a notion of trip similarity can be defined. If two or more trips are similar, then they can be combined into a route. The system can assess the similarity of two trips. The algorithm can relies on the latitude-longitude data from trips if sufficient data points are collected. If not, it requires an extra step to inferring which roads were traversed and can assume that the same route segments have been taken between two measurements at two road intersections Ia and Ib in order to reduce GPS measurements.

The similarity module 1050, after identifying trips (Trip A and Trip B) that are in the same vicinity, can use an algorithm to compute an average minimum point-segment distance between those two trips (e.g., from Trip A to Trip B). These averages can be added together and divided by two to calculate a symmetric score representing the similarity between the two trips. An example similarity algorithm may be as follows:

1. For every point $P_{Ai}$ in Trip A, find the closest trip segment $TS_{Bj}$ in Trip B. A trip segment is a straight line between two temporally adjacent GPS points. Calculate the minimum point-segment distance between $P_{Ai}$ and $TS_{Bj}$.

2. Add together these point-segment distances to compute the total distance between Trip A and Trip B: TotalDistanceAB.

3. Calculate the similarity score (ScoreAB) by dividing TotalDistanceAB by the number of data points in Trip A.

The example method compares points in one trip to line segments in the other trip, which helps account for variations in GPS sampling rate between the self-driven car GPS system and the location measurements of the mobile device. The sampling rate is important since the device, to save battery, does not calculate GPS measurements between the points Ba 1092 and Bb 1093 (GPS is not used once outside of Area a 1090 around the intersection Ia as measured by exiting at point Ba 1092 and until entering Area b 1091 of high frequency measurements around the next intersection Ib at point Bb 1093).

If the similarity between the two trips is below a specific threshold, the mobile device 1012 can be considered paired with the self-driven car 1013, and once this is determined, the pairing can remain until the self-driven car reaches a destination point. This "stickiness" of the pairing reduces computing processing power since the matching process described above is no longer necessary once the pairing is determined with sufficient confidence.

In some cases there could be another device 1011 that has an adjacent point of origin (O2 at 1015) and travelling alongside vehicle 1013 between point O2 and point B 1018. In this case the mobile device could be considered paired until it turns in a different direction at point B 1018 along path 1010 towards destination point D1 1014. As a result, the final pairing does not occur even if the paths are very similar initially. When there are multiple mobile devices that could match the known path of the self-driven vehicle, the final pairing decision can occur when there the similarities of the two mobile device paths is removed as one of the mobile device takes a significantly different route as illustrated at point B 1018.

The route matching algorithm can also snap routes on map roads coordinates. Measured points can be snapped to the most likely roads the vehicle was traveling along resulting in a path that smoothly follows the geometry and connectivity of the road. This can be important since most of the data captured and linked to road segments are related to map based information (number of car accidents per year on road segment in database 1030 for example). The route matching module 1025 may also implements a "snapping" algorithm to reconstruct paths/routes travelled in a real outdoor environment from the mobile device or self-driven vehicle given an existing map and road data of that environment. Moreover, since the road networks exist across various geospatial data sources (e.g., satellite imagery, demographics maps), the road topology should be consistent in its representation. To implement the snapping algorithm, a traversed path by a vehicle or route segment (constructed using transmitted data measurement from mobile devices) may be denoted as a sum of segment-angle pairs $(S_k, \theta_k)$ where the angle $\theta$ is the angle between two adjacent segments $S_k$ and $S_{k-1}$ and a segment S is frequently identified with its length. Each segment and angle measurement can contain some unknown error from the true value (the reference map geospatial data). A route is considered a collection of segments specified by its endpoints. When the GPS signal is lost or not used for battery efficiency, the traversed path of the mobile device can be extracted from the accelerometer and gyroscope signals of the device in the form of length heading pair along with cell ID or enhanced cell ID with time advance techniques. The snapping algorithm to a reference topological map route can find all sequences of segments in the topological map that match with measured trajectory segments of the device or self-driven car within the given error thresholds. In order to search all possibilities, the algorithm can uses a recursive function. If there are several drivers/devices tracked on the same route, the algorithm may select from several trajectories produced and output the one with a smallest summed error as a final result determination of a match. If there is no definitive selection, one can lower the threshold and rerun the algorithm until a trajectory is successfully snapped to the topological route on a map. The map snapping module may then report an error rate, which can be proportional to the distance between the received and snapped coordinates. Once the route matching and route snapping is completed 1025 it is determined if the vehicle is partially self-driven step 1026 and the percentage of time and route segments where it is self-driven 1028.

In some embodiments, classifying the driver into one or more groups can include classifying a group of drivers using partially self-driven vehicles for the purpose of predicting an insurance risk according to information not made available to third parties by the providers of self-driven systems and self-driven vehicles. In addition to not pairing the driver ID to the vehicle, the self-driven system may not provide key information regarding when and where the vehicle is being self-driven. In addition, it may not provide the number or density of self-driven vehicles on the routes being driven. This information set can have an important impact on the insurance risk of the vehicle and of the driver. In case of an accident, the manufacturer of the self-driven system may be liable if the vehicle was being self-driven at the time of the accident, so it is very likely that such information will reside in the logs of the self-driving system manufacturer, but it is unlikely that the data will be shared with the parties that are evaluating the insurance risk when there are no accidents. This information, however, can be important in ascertaining several factors that have an impact on the insurance risks of the driver and the vehicle, assuming that a self-driven vehicle on average will present a much lower risk than a manually-driven vehicle in the same way that airplanes on auto-pilot are on average safer than planes manually controlled by pilots, who can fall asleep or forget to check their instruments. Similarly, a high density or a high number of surrounding self-driven vehicles can reduce the risk associated with the vehicle, especially as manufacturers standardize their interfaces and interconnect vehicles in such a way that self-driven systems are aware of the path and trajectory of surrounding vehicles without having to rely on sensors, as this information can be provided by communicating data between vehicles. For those reasons, the insurance risk will be deemed lower when the vehicle is driven on route segments with a high percentage of other vehicles that are also self-driven and when the vehicle is in general on self-driven mode. Finally, where the vehicle is driven has an impact as well. In the same way that a plane is usually manually controlled during take-off and landing, there are some areas where vehicles being manually controlled will be safer, such as in urban areas. To better assess the insurance risk, it can be important to know the percentage of time the vehicle is in a self-driven mode, the type of route segments being driven while in self-driven mode, and the speed and mileage driven while in self-driven mode. In such embodiments, if the information is not made available by the self-driven system manufacturers through the exchange interface 1022, the classification is achieved by, first, matching a specific driver to a self-driven vehicle by matching the path of the driver's mobile device to the path of the self-driven vehicle, and then the determination of when and where the vehicle is in self-driven mode is further achieved by matching the typical driving pattern or "signature" of such self-driven vehicle with the encoded driving information. The matching process can include comparing the encoded driving information captured from the mobile device of the driver with (i) typical speed of self-driven vehicles over specific route segments and (ii) typical acceleration and deceleration patterns of self-driven vehicles in the context of traffic lights or changing lanes. Once the driving pattern matching is completed, the extent to which the vehicle is being self-driven can be determined and the corresponding encoded driving information associated to the underlying driving technology, and the extent to which the vehicle is driven manually can be determined and the corresponding encoded driving information associated to the proper driver ID.

The route segment and the time periods during which the vehicle is self-driven may be analyzed for profitability determination separately in 1029 and 1027 since the factors determining profitability impacts are very different. A database of parameters in 1039 and 1035 may be used to determine the profitability of the driver or a fleet of vehicles for certain products and services. The factors in 1039 can include the profile of the driver based on the historical routes.

The following are examples of selected parameters 1039 that can be used to classify drivers based on routes for different products and services:

How the vehicle is driven:

How many miles were driven—For certain products, mileage is a determining factor. For vehicle insurance, more miles driven means that the vehicle is often put at risk of causing property or liability claims.

How much time on the road—For certain products, time on the road is a determining factor. For data and bandwidth usage on outdoors macro wireless networks, in vehicle use of music streaming or podcasts are major contributors of data consumption and profitability.

How fast the vehicle is moving—For certain products, speed is a determining factor, especially when combined with time on the road and mileage when compared to types of roads. For example for vehicle insurance, high speed on highways for long periods of time is not as risky as high speed for short period of time in low speed limits urban zones. Speed and acceleration can also determine the number of times dangerous maneuvers occurred: speed above speed limits by a certain threshold or acceleration/deceleration (braking) considered too sudden according to a certain threshold.

How continuous is the driving—Number of stops can be a determining factor for some products and to determine if the vehicle is being used for commercial purposes (delivery or shared ride) or for leisure.

Where is the vehicle driven:

Demographics of areas traversed—Characteristics of area traversed can be important, especially the density of certain types of merchants to determine a profile: is the driver using vehicle mostly in commercial areas or residential areas. Is he driving mostly around malls, medical centers, or visiting clients?

Demographics and type of zoning to classify points of origin and destination points—Point of origin and destination can be important to determine a profile of the driver and his or her profitability potential for certain products and service. If, for example, points of origin are very high income areas with destinations to restaurants and luxury stores during the day, this implies someone with high disposable income for several products and services.

Type of road and characteristics—Characteristics of the roads, such as historical number of accidents per day or speed limits, have a determining effect on profitability. If, for example, a driver takes a highway with a higher than average number of accidents per day, profitability for vehicle insurance is affected. The traditional risk for car accidents on those roads can also be based on, for example, (a) time of day, based on historical frequency and severity of claims on those road segments at specific time of day, (b) road conditions as estimated by weather conditions during specific dates, and (c) the percentage of self-driven cars on those road segments versus human drivers (e.g., assumption that automated cars will cause less accidents).

When the vehicle is driven:

Time of day—Time of day can be an important factor to determine a profile, along with destination points. A vehicle travelling to entertainment areas around 1 AM can indicate a young individual that may get inebriated, and affects profitability potential for vehicle insurance or adventure travel packages, such as cruises.

Frequency—route frequency reinforces inferred behavior and profile conclusions and helps determine home, work, and other key areas, such as area most likely to go to shop during weekends. This has a general determining effect on profitability for products sold in the adjacent malls, for example.

The following are examples of selected parameters 1039 that can be used to classify fleets of self-driven vehicles based on vehicle characteristics and underlying technology:

Software version and computational power residing on vehicle—Software version can be important. The same car that may not have been updated with the latest software may be more prone to accidents.

Hardware Type and Version of Subsystems

GPS configuration and location services—The primary subsystem used for navigation and guidance can be based on a GPS (Global Positioning System) receiver, which computes present position based on complex analysis of signals received from at least four of the constellation of over 60 low-orbit satellites. GPS systems configuration can be classified in terms of accuracy sensitivity and response time to first fix. GPS can provide location accuracy on the order of one meter (the actual number depends on many subtle issues), which is a good start for the vehicle. Note that for a driver, who hopes to enter the car and get going, a GPS receiver takes between 30 and 60 seconds to establish initial position (time to first fix), so the autonomous vehicle must delay its departure until this first fix is computed. GPS subsystems are now available as sophisticated system on a chip (SoC) IC or multi-chip chipsets which require only power and antenna, and include an embedded, application-specific compute engine to perform the intensive calculations. Although many of these ICs have an internal RF preamp for the 1.5-GHz GPS signal, many of the vehicles opt to put the antenna on the roof with a co-located low-noise amplifier (LNA) RF preamplifier, and locate the GPS circuitry in a more convenient location within the vehicle.

Camera/LIDAR/Radar configuration—To enable split-second decision-making needed for self-driving cars, the LIDAR system (light detection and ranging, or a combination of light and radar subsystems) provides accurate 3D information on the surrounding environment. Using this data, the processor implements object identification, motion vector determination, collision prediction, and avoidance strategies. For radars built into the front and rear bumpers and sides of the vehicle, factors may take into consideration the operating frequency for the radar which is usually 77 GHz, to estimate the RF propagation characteristics, and sufficiency of resolution.

On board processing power—The processing power of the vehicle can be important to determine the speed at which the vehicle can execute complex software and process complex images and measurements from various sensor to make split second driving decisions.

Other Sensor Array configuration and sensitivity—Gyroscopes, accelerometers, proximity sensors, compass, sextant, and dead reckoning, for example.

Networking capabilities—Extent to which the self-driven cars are networked together so that decisions are made in a coordinated way with decision made by other nearby self-driven cars.

The set of data repository 1039 can therefore associates to each paired driver ID/device ID a primary set of data $r_1$ to $r_n$ for the routes and $i_1$ to $i_n$ for the derived driver interest. Similarly for self-driven vehicles, a primary set of data for paired driver ID/self-driven car ID if parameters $SD_1$ to $SD_N$ representing the self-driven vehicles characteristics and capabilities as described above.

Data set 1035 provides the weights or coefficients for various products and services that are used to determine profitability. In one embodiment, there is a set of weights or coefficients for vehicle or driver or fleet insurance. In another embodiment the set is aimed at predicting wireless communication services profitability. In another embodiment, a set of coefficients is used for medical devices and services profitability. The process to determine profitability for various services using route information are similar: First, speed and cumulative mileage per time period are used at step 1032 as determining factors. Then the profitability can be revised for types of road travelled (e.g., surrounding area demographics, historical accident statistics) and time of day on those roads to adjust the mileage and speed parameters with the impact that those two factors have on profitability. Then the profitability can be revised further using the inferred profile of the driver from historical routes 1039 or from information provided by the driver using the application on the device 1049. In the case of a self-driven vehicle, the route segments being self-driven can be adjusted using the characteristics/profile of the self-driven car instead of the driver profile (e.g., software version, sensor configuration, and sensitivity, etc.) 1039.

A "base case" that estimates the profitability based on traditional factors, rather than routes, is entered in 1035 based on prior steps in module 1030 using, for example, tables traditionally used by underwriters or marketing professionals familiar in the art of predicting profitability based on data segmentation. Those base tables can be modified to provide more importance on primary factors that were previously unavailable for the purpose of creating such estimates. Base coefficients are then determined to assess the relationship of independent variables provided by the system to generate the estimated profitability in the base tables. The algorithm then uses those coefficients to weight in real-time the various variables obtained through the analysis of routes travelled and profile category indices.

Using a feedback loop 1037 provides actual profitability from the service providers for certain drivers or fleet and a comparison is made at step 1038. Using those actual values for a sample of drivers, the software causes the processor to first assess each variable separately first (e.g., obtaining measures of central tendency and dispersion, frequency distributions, etc.) to asses to what extent the variable is normally distributed and assess the relationship of each independent variable, one at a time, with the dependent profitability variable (calculating the correlation coefficient) and assessing the relationships between all of the independent variables with each other (obtaining a correlation coefficient matrix for all the independent variables) and assessing the extent to which the independent variables are correlated with one another. The feedback loop 1037 and the traditional factors captured through the application 1049 and estimates of profitability using traditional factors 1036 are used to adjust the coefficients in database 1035 in order to have a multiple regression using a least squares methods to have a profitability predictor that is adjusted for actual results. Over time, the method using actual routes and route characteristics to determine profitability provides better results. For example fleet A from Manufacturer A and fleet B from manufacturer B can both have similar loss ratios if traditional methods were used, but the root cause of this similarity could be very different, something that traditional methods cannot distinguish: fleet B could have low claims because fleet B is driven mainly in rural areas, whereas fleet A can have low claims because it has excellent software even when driven mostly in urban areas. This distinction cannot be made without capturing the route characteristics and including them as factors in the calculation of profitability. The risk adjusted system will be such that risk pool will be determined as a factor of (1) how much the car is driven (risk adjusted mileage adjusted for where it is driven), (2) how the car was driven, (3) the cost of potential claim, and (4) who/what is driving the car. The risk pool assessment uses different weights to those four factors and put them in pools or groups that are predictors of the future insurance cost (loss ratio) and intermediary cost of the individuals or fleets in the pool. The weights used in the various regression analyses to determine classifications can be altered using the feedback loop of actual claims until the revised weights when applied retroactively to historical data can be a better predictor of the claims as provided by the feedback loop.

While this invention has been particularly shown and described with references to example embodiments thereof, it will be understood by those skilled in the art that various changes in form and details may be made therein without departing from the scope of the invention encompassed by the appended claims.

What is claimed is:

1. A method of collecting driving information and classifying drivers, including human drivers or self-driving systems, the method comprising:
   collecting driving information using a device associated with a driver and a vehicle, the driving information including routes driven in the vehicle, geocoded locations, mileage, times of day, and speeds, the collection of driving information being enabled and disabled based on location and movement of the device to reduce use of power and bandwidth;
   encoding the driving information and transmitting the encoded driving information to a server;
   storing, in a database associated with the server, an identifier associated with the driver and the encoded driving information;
   determining, and storing in the database, predicted future typical route segments that the driver is likely to travel over a certain period of time and associated times of day based on the encoded driving information;
   classifying the driver into one or more groups based on the encoded driving information;
   associating an advertisement or promotional content with at least one of the typical route segments driven by the driver in the vehicle;
   determining a point along the associated route segment at which the advertisement or promotional content is to be presented to the driver to provide a sufficient amount of time for the driver to take an action associated with the advertisement or promotional content;
   presenting the advertisement or promotional content to the driver via the device when the driver drives along the associated route segment in the vehicle and reaches the point along the associated route segment at which the advertisement or promotional content is to be presented;

enabling the driver to respond to the advertisement or promotional content; and providing the driver with a share of advertising revenue if the driver responds to the advertisement or promotional content.

2. A method as in claim 1 wherein the point along the route segment at which the advertisement or promotional content is to be presented to the driver is a certain distance before an exit or turn leading to an establishment associated with the advertisement or promotional content, the certain distance determined based on vehicle speed and location of vehicle along the route segment.

3. A method as in claim 1 further including:
providing representations of typical route segments driven by specific target groups of drivers to an advertisement provider; and
receiving from the advertisement provider an advertisement request and a selection of at least one of the route segments driven by the specific target groups of drivers to be associated with an advertisement or promotional content.

4. A method as in claim 1 further including:
presenting the driver with an incentive to visit an establishment associated with at least one of the typical route segments if the driver repeatedly travels along the route segment;
detecting the presence of the driver around the location of the establishment for a sufficient amount of time to determine whether a visit to the establishment occurred to determine whether to allow a redemption of any promotional incentive provided by the establishment; and
crediting an account of the driver with the incentive if the driver visits the establishment and fulfills any requirements of the incentive.

5. A method as in claim 1 wherein the device is a mobile computing device, and wherein the method further includes:
creating a profile of the driver based on the driver's use of the mobile device and the encoded driving information;
associating a socio-demographic and potential interests for products and services with the profile of the driver based on the driving information;
associating, based on the socio-demographics and interests, the driver with corresponding advertising categories used by online advertiser networks and exchanges; and
synchronizing the driver's activity on the mobile device and the routes driven by the driver and locations visited with the driver's virtual activity on internet browsers to represent in the profile of the driver web sites visited using the browser and physical establishments visited or driven by that are associated with the typical route segments to categorize the driver in an advertising category to be used by advertisement providers.

6. A method of collecting driving information and classifying drivers, including human drivers or self-driving systems, the method comprising:
collecting driving information using a device associated with a driver and a vehicle, the driving information including routes driven in the vehicle, geocoded locations, mileage, times of day, and speeds, the collection of driving information being enabled and disabled based on location and movement of the device to reduce use of power and bandwidth;
encoding the driving information and transmitting the encoded driving information to a server;
storing, in a database associated with the server, an identifier associated with the driver and the encoded driving information;
determining, and storing in the database, predicted future typical route segments that the driver is likely to travel over a certain period of time and associated times of day based on the encoded driving information;
classifying the driver into one or more groups based on the encoded driving information, wherein:
classifying the driver into one or more groups includes classifying, into the one or more groups, a group of drivers or a fleet of self-driven or partially self-driven vehicles that use materially similar underlying self-driving technology component software, hardware, or sensor configuration;
collecting driving information includes collecting driving information using a device associated with each driver and associated vehicle or using connectivity to processors and systems associated with a self-driven or partially self-driven vehicle, the driving information including mileage, routes driven by the vehicle, time of day, and speed; and
classifying the driver into one or more groups based on the encoded driving information includes determining an insurance risk for each driver or, in a case of a fleet of self-driven or partially self-driven vehicles, determining an insurance risk by aggregating the encoded driving information of all vehicles of the fleet that uses similar underlying self-driving technology components, the insurance risk determination including applying (i) a plurality of features of the routes driven including speed limit, historical claims along the routes, and zip codes traversed, and (ii) a plurality of features of the driver including historical routes driven, driving behavior, times of day, and (iii) if known, age, gender, zip code, vehicle identification number, driver's license number, vehicle information, credit score, and historical infractions or, in a case of a fleet of self-driven or partially self-driven vehicles, the underlying driving technology including sensors sensitivity, historical cumulative mileage, and associated claims, to assigned weights for scaling and determining the insurance risk;
presenting the driver or underlying driving technology insurance risk classification to a plurality of entities;
receiving requests from at least one of the entities to send promotional messages to drivers within a specific risk classification or to provide insurance for or offer services to the driver or fleet of self-driven vehicles using the underlying driving technology; and
selecting one of the entities to provide insurance for or offer services to the driver or fleet of self-driven vehicles using the underlying driving technology.

7. A method as in claim 6 wherein determining an insurance risk for a plurality of self-driven vehicles includes determining an insurance risk based on a combined mileage for the plurality of self-driven vehicles and a combination of routes driven by the plurality of self-driven vehicles.

8. A method as in claim 6 further including modifying the weights affecting the plurality of factors used to determine the classification of insurance risks in response to actual loss data being provided to cause the determined insurance risk, when applied retroactively to historical data, to correspond more closely to an actual insurance risk as calculated from actual loss data.

9. A system for collecting driving information and classifying drivers, including human drivers or self-driving systems, the system comprising:
a device associated with a driver and a vehicle and configured to (i) collect driving information, the driving information including routes driven in the vehicle, geocoded locations, mileage, times of day, and speeds, (ii) enable and disable the collection of driving information based on location and movement of the device to reduce use of power and bandwidth, (iii) encode the driving information, (iv) transmit the encoded driving information to a server, (v) present an advertisement or promotional content to the driver as the driver drives along a route segment corresponding to the advertisement or promotional content, and (vi) enable the driver to respond to the advertisement or promotional content;
a database associated with the server, in communication with the device, and configured to store an identifier associated with the driver, the encoded driving information, predicted future typical route segments that the driver is likely to travel over a certain period of time and associated times of day based on the encoded driving information, and advertisements or promotional content received from advertising providers;
a processor associated with the server, in communication with the database and the device, and configured to determine the predicted future typical route segments and classify the driver into one or more groups based on the encoded driving information, and further configured to (i) associate the advertisement or promotional content with at least one route segment corresponding to the advertisement or promotional content in response to a request from an advertising provider, (ii) determine a point along the route segment at which the advertisement or promotional content is to be presented to the driver to provide a sufficient amount of time for the driver to take an action associated with the advertisement or promotional content, (iii) cause the device to present the advertisement or promotional content to the driver at the determined point along the route segment, and (iv) provide the driver with a share of advertising revenue if the driver responds to the advertisement or promotional content.

10. A system as in claim 9 wherein the point along the route segment at which the advertisement or promotional content is to be presented to the driver is a certain distance before an exit or turn leading to an establishment associated with the advertisement or promotional content, and wherein the processor is configured to determine the point along the route segment based on vehicle speed and location of vehicle along the route.

11. A system as in claim 9 wherein the processor is configured to (i) provide representations of typical route segments driven by a target group of drivers to an advertisement provider and (ii) associate advertisements or promotional content with at least one of the route segments based on a selection received from the advertisement provider of the route segment.

12. A system as in claim 9 wherein the processor is configured to (i) cause the device to present the driver with an incentive to visit an establishment associated with at least one of the route segments driven by the driver if the driver repeatedly travels along the route segment, (ii) detect the presence of the driver around the location of the establishment for a sufficient amount of time to determine whether a visit to the establishment occurred to determine whether to allow a redemption of any promotional incentive provided by the establishment, and (iii) update an account of the driver stored in the database with the incentive if the driver visits the establishment and fulfills any requirements of the incentive.

13. A system as in claim 9 wherein the device is a mobile computing device, and wherein the processor is configured to (i) create a profile of the driver based on the driver's use of the mobile device and the encoded driving information, (ii) associate a socio-demographic and potential interests for products and services with the profile of the driver based on the driving information, (iii) associate, based on the socio-demographics and interests, the driver with corresponding advertising categories used by online advertiser networks and exchanges, and (iv) synchronize the driver's activity on the mobile device and the routes driven by the driver and locations visited with the driver's virtual activity on internet browsers to represent in the profile of the driver web sites visited using the browser and physical establishments visited or driven by that are associated with the typical route segments to categorize the driver in an advertising category to be used by advertisement serving providers.

14. A system for collecting driving information and classifying drivers, including human drivers or self-driving systems, the system comprising:
a device associated with a driver and a vehicle and configured to (i) collect driving information, the driving information including routes driven in the vehicle, geocoded locations, mileage, times of day, and speeds, (ii) enable and disable the collection of driving information based on location and movement of the device to reduce use of power and bandwidth, (iii) encode the driving information, and (iv) transmit the encoded driving information to a server;
a database associated with the server, in communication with the device, and storing an identifier associated with the driver, the encoded driving information, and predicted future typical route segments that the driver is likely to travel over a certain period of time and associated times of day based on the encoded driving information; and
a processor associated with the server, in communication with the database and the device, and configured to determine the predicted future typical route segments and classify the driver into one or more groups based on the encoded driving information;
the processor being further configured to classify, into the one or more groups, a group of drivers or a fleet of self-driven or partially self-driven vehicles that use materially similar underlying self-driving technology component software, hardware, or sensor configuration;
the device used to collect driving information including (i) a device associated with each driver and its associated vehicle or (ii) processors and systems associated with a self-driven or partially self-driven vehicle, the driving information including mileage, routes driven by the vehicle, time of day, and speed; and
the processor being further configured to:
classify the driver into one or more groups based on the encoded driving information by determining an insurance risk for each driver or, in a case of a fleet of self-driven or partially self-driven vehicles, determining an insurance risk by aggregating the encoded driving information of all vehicles of the fleet that uses similar underlying self-driving technology components, the insurance risk determination including applying (i) a plurality of features of the routes driven including speed limit, historical claims, and zip codes traversed, and (ii) a plurality of features of the driver including historical routes driven, driving behavior, times of day, and (iii) if known, age, gender, zip code, vehicle identification number, driver's license number, vehicle information, credit score, and historical infractions or, in a case of a fleet of self-driven or partially self-driven vehicles, the underlying driving technology including sensors sensitivity, historical cumulative mileage, and associated claims, to assigned weights for scaling and determining the risk;

present the driver or underlying driving technology insurance risk classification to a plurality of entities;

receive requests from at least one of the entities to send promotional messages to drivers within a specific risk classification or provide insurance for or offer services to the driver or fleet of self-driven vehicles using the underlying driving technology; and enable selection of one of the entities to provide insurance for or offer services to the driver or fleet of self-driven vehicles using the underlying driving technology.

15. A system as in claim 14 wherein the processor is configured to determine the insurance risk based on a combined mileage for a plurality of self-driven vehicles and a combination of routes driven by the plurality of self-driven vehicles.

16. A system as in claim 14 wherein the processor is configured to determine when a driver is driving a self-driven vehicle and when the self-driven vehicle is in an automatic driving mode.

17. A system as in claim 14 wherein the processor is configured to modify the weights affecting the plurality of factors used to determine the classification of insurance risks in response to actual loss data being provided to cause the determined insurance risk, when applied retroactively to historical data, to correspond more closely to an actual insurance risk as calculated from actual loss data.

* * * * *